United States Patent
Jiang et al.

(10) Patent No.: US 7,080,073 B1
(45) Date of Patent: Jul. 18, 2006

(54) METHOD AND APPARATUS FOR FOCUSED CRAWLING

(75) Inventors: Dongming Jiang, Plainsboro, NJ (US); Arvind Krishnamurthy, Hamden, CT (US); Jaswinder Pal Singh, New York, NY (US); Randolph Wang, Princeton, NJ (US)

(73) Assignee: firstRain, Inc., Foster City, CA (US)

( * ) Notice: Subject to any disclaimer, the term of this patent is extended or adjusted under 35 U.S.C. 154(b) by 275 days.

(21) Appl. No.: 10/179,476

(22) Filed: Jun. 24, 2002

Related U.S. Application Data

(63) Continuation-in-part of application No. 09/940,188, filed on Aug. 27, 2001, and a continuation-in-part of application No. 09/935,782, filed on Aug. 22, 2001, and a continuation-in-part of application No. 09/935,783, filed on Aug. 22, 2001, and a continuation-in-part of application No. 09/933,888, filed on Aug. 20, 2001, and a continuation-in-part of application No. 09/933,885, filed on Aug. 20, 2001, now abandoned.

(60) Provisional application No. 60/227,875, filed on Aug. 25, 2000, provisional application No. 60/227,125, filed on Aug. 22, 2000, provisional application No. 60/226,479, filed on Aug. 18, 2000.

(51) Int. Cl.
  *G06F 17/30* (2006.01)
(52) U.S. Cl. .............................. 707/7; 707/10; 715/513
(58) Field of Classification Search ............... 707/1–10, 707/100–104.1, 200–205; 715/513
  See application file for complete search history.

(56) References Cited

U.S. PATENT DOCUMENTS

| | | | |
|---|---|---|---|
| 5,717,914 A | 2/1998 | Husick et al. | |
| 6,119,124 A | 9/2000 | Broder et al. | |
| 6,125,361 A | 9/2000 | Chakrabarti et al. | |
| 6,219,833 B1 | 4/2001 | Solomon et al. | |
| 6,260,042 B1 | 7/2001 | Curbera et al. | |
| 6,314,565 B1 | 11/2001 | Kenner et al. | |
| 6,363,377 B1 | 3/2002 | Kravets et al. | |
| 6,377,945 B1 | 4/2002 | Risvik | |
| 6,463,430 B1 * | 10/2002 | Brady et al. | 707/3 |
| 6,493,702 B1 | 12/2002 | Adar et al. | |
| 6,523,036 B1 | 2/2003 | Hickman et al. | |
| 6,556,984 B1 | 4/2003 | Zien | |
| 6,560,620 B1 | 5/2003 | Ching | |
| 6,601,075 B1 | 7/2003 | Huang et al. | |
| 6,643,650 B1 | 11/2003 | Slaughter et al. | |
| 6,643,652 B1 | 11/2003 | Helgeson et al. | |
| 6,658,423 B1 | 12/2003 | Pugh et al. | |
| 6,701,318 B1 | 3/2004 | Fox et al. | |
| 6,760,902 B1 | 7/2004 | Ott | |
| 6,785,673 B1 | 8/2004 | Fernandez et al. | |
| 2001/0018693 A1 | 8/2001 | Jain et al. | |
| 2001/0043234 A1 | 11/2001 | Kotamarti | |

(Continued)

OTHER PUBLICATIONS

Babowal, D. et al., "From Information to Knowledge: Introducing WebStract's Knowledge Engineering Approach," Proceedings of the 1999 IEEE Canadian Conference, pp. 1525-1530.

(Continued)

*Primary Examiner*—Mohammad Ali
(74) *Attorney, Agent, or Firm*—Wilson Sonsini Goodrich & Rosati

(57) ABSTRACT

The present invention pertains to the field of computer software. More specifically, the present invention relates to dynamic discovery of documents or information through a focused crawler or search engine.

19 Claims, 5 Drawing Sheets

U.S. PATENT DOCUMENTS

| | | |
|---|---|---|
| 2001/0049675 A1 | 12/2001 | Mandler et al. |
| 2001/0054009 A1 | 12/2001 | Miller et al. |
| 2002/0135800 A1 | 9/2002 | Dutta |
| 2002/0165717 A1 | 11/2002 | Solmer et al. |
| 2002/0166081 A1 | 11/2002 | Richardson et al. |
| 2002/0174147 A1 | 11/2002 | Wang et al. |
| 2003/0130998 A1 | 7/2003 | Fox et al. |

OTHER PUBLICATIONS

Chakrabarti, S. et al., *Focused Crawling: A New Approach to Topic-Specific Web Resource Discovery*, Mar. 29, 1999.

Davulcu, H. et al., (1999), "A Layered Architecture for Querying Dynamic Web Content," pp. 491-502.

Parberry, I., "Problems on Algorithms," Dept. of Computer Science, University of North Texas, Denton TX, Aug. 1994.

Schatz, B. et al. (1996), "Federating Diverse Collections of Scientific Literature," pp. 28-36.

Shasha, D. et al., "Approximate Tree Pattern Matching," Chapter 14, pp. 1-28.

Tsuda, H. et al. (1998), "WorkWare: WWW-based Chronological Document Organizer," pp. 1-6.

Zhang, K., et al., "On the editing distance between unordered labeled trees," *Information Processing Letters*, May 25, 1992, vol. 42, pp. 133-139.

Kaizhong Zhang et al., "On the Editing Distance Beween Unordered Labeled Trees", May 25, 1992, Elsevier Science Publishers, pp. 133-139.

Eugene W. Meyers, "An 0(ND) Difference Algorithm and Its Variations" Algorithica (1986) ppagesd. 251-266.

Fred Douglis et al., "The AT&T Internet Difference Engine: Tracking and Viewing Changes on the Web", World Wide We, Jan. 1998, pp. 27-44.

Soumen Chakrabarti et al., Focused Crawling: A New Approach to Topic-Specific Web Resource Discovery, www.almaden.ibm.com/almaden/feat/www/8/, printed Aug. 2, 2001, pp. 1-19.

Junghoo Cho et al., "Efficient Crawling Through URL Ordering" www-db.stanford.edu/-cho/crawler-paper/ printed Aug. 2, 2001, pp. 1-18.

Jon M. Kleinberg, "Authoritative Sources In a Hyperlinked Environment," www.cs.cornell.edu/home/kleinber/, printed Aug. 2, 2001, pp. 1-34.

* cited by examiner

```
Enqueue(URL_QUEUE, staring_url);

While (! Empty(URL_QUEUE)) {
    url = Dequeue(URL_QUEUE);
    page = Crawl_page(url);
    Enqueue(CRAWLED_PAGES, (url, page));
    PAGE_TO_FETCH_LIST = Extract_urls(page);
    For each u in PAGE_TO_FETCH_LIST {
        Enqueue(LINKS, (url, u));
        If ((u not in URL_QUEUE) and  ((u, -) not in CRAWLED_PAGES)) {
            Fetch_page(u);
            Enqueue(URL_QUEUE, u);
        }
    }
    Compute_PageRank(URL_QUEUE+CRAWLED_PAGES);
    Reorder_queue(URL_QUEUE);
}
```

Figure 3

F: Initiating page fetches (protocol management)
R: Receiving/taking pages from incoming queue
C: Computation
L: Loading pages from remote servers through network

US 7,080,073 B1

METHOD AND APPARATUS FOR FOCUSED CRAWLING

CROSS REFERENCE TO RELATED APPLICATIONS

This application is a continuation-in-part of U.S. application Ser. No. 09/940,188, filed Aug. 27, 2001, U.S. application Ser. No. 09/935,782 filed Aug. 22, 2001, U.S. application Ser. No. 09/935,783 filed Aug. 22, 2001, U.S. application Ser. No. 09/933,885 filed Aug. 20, 2001, now abandoned U.S. application Ser. No. 09/933,888 filed Aug. 20, 2001 which claims priority to U.S. Provisional Application No. 60/226,479, filed Aug. 18, 2000, U.S. Provisional Application No. 60/227,125, filed Aug. 22, 2000 and U.S. Provisional Application No. 60/227,875, filed Aug. 25, 2000. These applications are incorporated herein by reference in its entirety.

FIELD OF THE INVENTION

The present invention pertains to the field of computer software. More specifically, the present invention relates to dynamic discovery of documents or information through a focused crawler or search engine.

BACKGROUND OF THE INVENTION

A search engine is a program that helps users find relevant information on a connected set of information sources. While the information sources can be connected by any mechanism (for example, being on a single server, a clustered server, a local area network or a wide area network), they can be on the World Wide Web. Numerous web search engines exist today.

SUMMARY OF THE INVENTION

Various methods are described for guiding a focused crawler efficiently to crawl relevant pages while reducing the time taken to crawl them. Various embodiments can perform ranking, including combinations of similarity-based and link-structure-based ranking, efficiently on the fly as pages are being crawled by the focused crawler, and/or to use the results dynamically to guide what pages are crawled next. The methods of specifying the query and specific hints or methods for guiding the crawl can be provided to the crawler through an extensible interface. Some embodiments are methods to enable the crawler to obtain the most desirable pages as quickly as possible, such as using PageRank-like or hub-and-authority-like link-structure based as well as similarity-based ranking analysis on the fly to guide the crawler and making appropriate tradeoffs between quality and speed, including the use of novel approximation methods in the ranking process and the development of extensions to link-based ranking algorithms in the presence of partial information. The invention also presents methods for determining pages that will serve as starting points for a crawl, and applications of a focused crawler in constructing a scalable search/crawl infrastructure. Some embodiments describe a number of methods that may be used in the context of a focused crawler or a search engine that uses focused crawlers. Various combinations of these methods may be used in a particular embodiment of the crawler or search engine.

BRIEF DESCRIPTION OF THE DRAWINGS

FIG. 3 illustrates one embodiment of a pseudo-code for basic operation of a Focused Crawler.

Existing Web Search Engines

Figure 1:
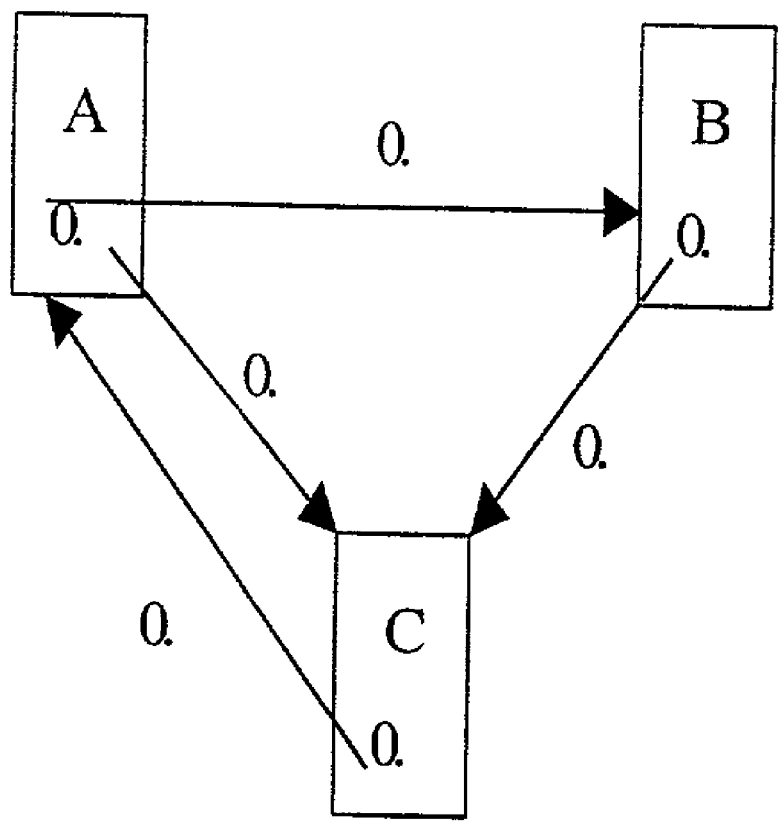
FIG. 1 illustrates one embodiment of a steady-state PageRank solution.

Existing search engines have three major components:

A crawler traverses the web by following its link structure and examining the documents encountered.

An indexer builds an index data structure on the contents of the documents, based on a vocabulary, so that documents can be found quickly given queries based on the vocabulary.

A query engine takes queries from users, looks up the indexed structure, and returns the desired documents to the users.

As the number of documents on the web explodes, recognizing the importance of delivering the most relevant information to users, several search engine builders have invested significant effort in the indexer component of their search engines. Their goal is to augment the index data structure with ranking information so that the most relevant documents are given the highest ranking. Ranks are based on the similarity of the query to the documents found (for example, based on index information and on where in the document the query terms are found) as well as on link structure of the pages and/or other properties. Two known techniques are described that use link structure in addition to similarity: PageRank and hub-and-authority. The techniques they use for similarity are, or can be, very similar. Link structure use is discussed.

The first technique, PageRank, is the document-ranking algorithm employed by the "Google" search engine. It is a citation-based technique. More specifically, if document A references (links to) document B, for example, then document B receives a fraction of document A's prestige; this fraction is inversely proportional to the number of documents that document A references. Since there are cycles in the link structure of the web graph, computing PageRanks for pages is an iterative calculation. Since the calculation is expensive, it is computed on the pages in the search engine's database independently of an individual query. Upon a query, pages are ranked by a combination of their PageRank score and their similarity to the query. The second link-structure based ranking technique, hub-and-authority, is due to Kleinberg et al. This method treats an "interesting" portion of the web as a graph in which each node has two types of values: a hub value and an authority value. Good hubs (nodes with high hub value) are documents that point to many "good" authority nodes (nodes with high authority value), and good authority nodes are documents that are pointed to by many "good" hub nodes. Here too, the computation of hub and authority scores is an iterative calculation, and these scores are combined with measures of similarity to the query. A common theme of these techniques is that both exploit the link structure of the web to infer relevance ranking. Experiences show that these indexing techniques have better success at returning the most relevant documents to users. Other search engines use other metrics (in addition to similarity) to determine relevance, such as the number of times a particular page is clicked on when presented as a search result, the amount that the owner of a page is willing to pay for the page to be ranked higher, etc.

The PageRank algorithm is described more fully here, and is used as an algorithm in some embodiments.

The PageRank Algorithm

Web pages vary greatly in terms of the number of back links that they have (i.e. links that point to them from other pages). Generally, pages with a lot of back links are considered more important than pages with few back links, since many other pages have chosen to point to them. The PageRank algorithm is one form of a citation-based algorithm that provides a more sophisticated method for doing such citation-based importance measurement. It is used by the Google search engine (www.google.com), although in that case it is used to rank pages that have already been fetched by a generic crawl into the search engine's database, rather than to guide a focused crawler. An intuitive description of PageRank is as follows: a page has high rank if the sum of the ranks of its back links is high. This can be because it has many back links or that it has back links from pages that are themselves important, i.e. that have high PageRank. Since each link from one page to another confers importance from the source page to the destination page, a page with few links confers more importance to each of the pages it links to than a page of similar PageRank with many links.

To formalize, let u be a web page. Then, let $F_u$ be the set of pages u points to and $B_u$ be the set of pages that point to u. Let $C_u=|F_u|$ be the number of links from u and let $0<d<1$ be a damping factor. Suppose there are T total pages on the web. Then the PageRank R is defined as:

$$R(u) = d \times \frac{1}{T} + (1-d) \sum_{v \in B_u} \frac{R(v)}{C_v} \quad (1)$$

Note that the rank of a page is divided among its forward links evenly, thus conferring equal importance to the pages they point to. The ranks R(u) can be scaled so that $\Sigma R(u)=1$, in which case R(u) can be thought of as a probability distribution over pages and hence a weight function. The PageRank distribution has a simple and useful interpretation in terms of a random walk. Imagine a web surfer who wanders the Web. If the surfer visits page u, the random walk is in state u. At each step, the web surfer either jumps to a page on the web chosen uniformly at random, or the web surfer follows a link chosen uniformly at random from among the links on the current page. The damping factor d can be viewed as the probability of making a random jump; so 1-d is the probability of following a link from the current page. Under this interpretation, R(u) is simply the equilibrium probability that such a surfer is at page u. This means that pages with high PageRank are more likely to be visited by the surfer on the Web than pages with low PageRank. The equation is recursive, but it may be computed by starting with any set of rank values and iterating until the computation converges. The iterative computation can be represented as follows:

$R_0=S$; /* initialization for all pages */

$\epsilon$=convergence tolerance /* settable parameter */;

$\delta=0$;

While $(\delta>\epsilon)$ {

$$R_{i+1}(u) = d \times \frac{1}{T} + (1-d) \sum_{v \in B_u} \frac{R_i(v)}{C_v};$$

$\delta=\|R_{i+1}-R_i\|_1$; /* change in Pagerank; calculation on all pages */}

The propagation of ranks and a consistent steady state solution for a set of pages is depicted in FIG. 1.

Inadequacies of Web Search Engines

Despite advances such as link-structure based ranking algorithms, existing web search engines suffer from three major problems: their coverage of the web, the freshness of their data, and the relevance of the pages they return and the order in which they return them. Research papers that measure coverage estimate that the biggest search engines covered about a third of the indexable web in 1997 and about a sixth in 1999. With the rate at which the web is growing, the coverage is diminishing all the time. With regard to freshness, it is often months between two visits to the same web site by the crawlers of the best search engines. So the information in the databases and indexes of search engines can be quite stale. With regard to relevance, substantial progress has been made by the recent link-based algorithms and by improvements in similarity algorithms in ranking the pages that are in the search engine's database, but relevance is still limited by coverage and freshness of the information in the database and index.

Focused Crawling

Dynamic focused crawling is a solution to the problems of coverage, freshness and relevance. Instead of using a generic crawler to crawl the web, starting from popular starting points (such as a major web site's directory) to ensure that a generically popular small fraction of the web is crawled and indexed, in some embodiments focused crawl is to crawl dynamically in response to a specific "query". The query can be very specific or can be designed to provide coverage of a topic of interest. Queries used by focused crawlers include keywords and keyword examples as well as a set of example pages of the type that are being sought via the crawl together with a classification method for pages. The crawl is focused in that it is guided in its traversal of documents and links by the specific query. By performing specific focused crawls rather than generic crawls, the focused crawler can venture more deeply into the areas of the web that are more relevant to the subject of the query and ignore those areas that are not relevant, regardless of how generically important those areas might be. Focused crawls can be performed in response to a specific query by a user, or they can be performed in the background on a scheduled basis to build up a database of relevant, fresh and comprehensive information about a set of topics, and enable a user to search this database just as they might search the database of a generic search engine.

There are several advantages to focused crawling rather than looking up a generically crawled web database/index upon a query, and to using focused crawling rather than generic crawling to build and maintain or refresh a database of information (such as in a search engine). First, it enables better coverage and greater freshness of data relevant to the query. Second, the web is inherently non-uniform, so when documents relevant to a particular query or topic are sought it makes sense from an efficiency viewpoint to crawl it non-uniformly guided by the particular query at hand. Third, while in current search engines the crawling is done generically and only the ranking (and then usually only the similarity portion of the ranking) is query-specific, in focused crawling the ranking of pages can be done dynamically (and yet potentially in a query-specific manner) as pages are crawled, and the current ranking at any time can be used to guide which pages will be crawled next. This not only makes the crawling more efficient but it also ensures that relevance rankings are continually updated and built into the crawling mechanism. Finally, for the above reasons, focused crawling can be much more efficient at obtaining the desired data than generic crawling followed by ranking.

The way in which ranking is done dynamically is critical to the performance and success of a focused crawler, since this is what is used to guide the crawler in certain directions over others: poor ranking would guide the focused crawler in the wrong directions and hence take much longer to find the most relevant pages. Only the part of the web crawled so far or available to the crawler in a database (perhaps constructed from previous crawls or other methods) is known to the crawler at any given time, so the ranking that guides the crawl has to be based on partial information. For example, the entire link structure connecting all documents on the web (or even all documents to be crawled in the current crawl) is not known, but only the link structure of links associated with the pages that are already available to the crawler at a given time, so the graph whose link structure is used is a partial graph. Good ranking can be expensive to perform dynamically for a scenario such as guiding a crawl, and developing fast, high-quality ranking algorithms is in some embodiments of effective focused crawling.

Applications of a Focused Crawler

A focused crawler, especially one that can accept other inputs than keywords as queries, can be used for many purposes, both in a mode where a crawl is launched when a user issues a query and in a mode where the focused crawler is used to build up and maintain/refresh a database which is looked up upon a user's query (for example, as a search engine). A few examples are listed here.

a) Users wanting very comprehensive, fresh and relevant results for their queries may use a focused crawler or a search engine built with a focused crawler instead of using a generic search engine.
  b) Power users may use an extensible focused crawler for various "corporate" or "business" purposes. These include obtaining up-to-date information from the Web for research, crawling the web for up-to-date resumes or job postings, obtaining business intelligence information (for example, crawling for online advertisements and analyzing them to understand how and where competitors advertise, crawling to find references). Online businesses may especially use such a tool; for example, a business-to-business exchange may use it to find suppliers or buyers who sell/buy certain types of items and should be included in the exchange, and online communities may use it to find people on the Web who have shared interests (as reflected in their Web pages) and therefore might be approached to join the community.
  c) Online 'portals' may use it to gather information relevant to their business, and then parse or analyze the gathered pages to extract relevant information and store it in a database; the information in the database can then be used to build value-added service provided to portal customers. For example, a portal may use a focused crawler to build topic-specific search engines or directories of resources. Or information that can be used for constructing wireless data services can be extracted from crawled pages, and targeted information channels built on top of the resulting database.
  d) A focused crawler can serve as the basis of a very comprehensive topics-specific or generic search engine that provides comprehensive, up-to-date and relevant results.

DETAILED DESCRIPTION

Some embodiments in focused crawling quickly obtain high-quality pages that are relevant to the query. While some of the more sophisticated search engines use periodic off-line ranking of pages according to link structure or other information, and combine this generic information with query-specific similarity information at search-time, some embodiments repeatedly invoke the sophisticated techniques in real-time to guide the crawl. An algorithm most similar to the PageRank algorithm can be used in some embodiments (used by the Google search engine) as our example link-structure based ranking algorithm, since it makes description concrete and simpler, though the techniques in some embodiments are applicable to the use of other link-based ranking algorithms like hub and authority as well as to some non link-based ranking algorithms as well. It is worth noting that in any given ranking, PageRanks may be computed based solely on link structure and then combined with per-page similarity to the query to determine a composite ranking, or similarity may be factored in to the individual pageranks (or weights) given at the beginning of the iterative calculation to the nodes of the graphs, so the iterative calculation is done using weights that have a different meaning from those described in the earlier description of PageRank, in that they include similarity scores. Even in the former case, the prestige conferred by PageRank itself is itself query-specific in the sense that it is computed only on pages that the focused crawl is deeming relevant to the query as it goes along. This is unlike the PageRanks computed by a generic PageRank computation done on the entire database of a search engine, and is another advantage of link-structure based focused crawling in obtaining relevant pages quickly. The latter approach, which includes similarity information in the initial weights given to nodes before the iterative calculation, is clearly unlike using pure link-structure based ranks as weights given to nodes before the iterative calculation. The similarity scores given to a document may be based on the document itself, or on similarity computed on documents that point to that document (directly or indirectly via other documents) on the similarity computed with anchor text of links that point to the document (directly or indirectly via other documents), or on similarity computed with those links themselves.

Terminology

The following description used the following terminology:

Documents include fetched documents and unfetched documents. Fetched documents include documents obtained locally or remotely. Examples of unfetched documents include links or URLs, where for example the documents that those URLs or links refer to have not yet been fetched.
  Accessed data, for example parts of input queries, may exist locally or remotely. For example, some of the keywords used in the crawl metric might have been prestored by the crawler, making the act of receiving the keywords possible but not necessary.

Crawl metric quantifies the priority for crawling links emanating from a certain page within the context of a particular focused crawl.

Search metric quantifies the relevance or importance of a document to the search query.

The query given to the focused crawler may consist of multiple parts, where some parts are used to evaluate documents for the purpose of guiding the crawl and other (including perhaps some or all of the same) parts are used to evaluate target documents to be returned to the user in response to the query. Or separate queries may be provided for the crawl guidance metric or 'crawl metric' and for the target evaluation metric or 'search metric.' These separate queries can be treated as parts of the same query. In each case, the parts used by the crawl metric and the parts used by the search metric may consist of multiple sub-parts, for example some used to evaluate the document being ranked, others used to evaluate the anchor texts or links embedded in documents that point to that document (directly or indirectly), etc. These can be treated as the query input, regardless of how the crawler uses it to crawl and search. Also, as mentioned earlier, some portions of the query that the crawler treats as its input may not be provided by the user in launching the crawl, but may be available to the crawler from before. For example, if a crawler is used to find resumes, certain keywords or methods used to evaluate good documents to crawl next may be pre-stored in the crawler or in a local database or data structure. These can be referred to as inputs, regardless of whether they are provided by the user when launching the crawl or are pre-stored by the crawler. The manner in which the queries are described (e.g. keywords and keyword expressions, Basic Operation of a Focused Crawler The high level functionality of a focused crawler can be described as follows:

1. Fetch a set of pages that are most likely to be relevant
2. Analyze the pages that have been fetched
3. Generate a set of new requests on page fetch based on 2, and go back to step 1.

The intelligence in step 2 determines how well the crawler covers relevant pages on web, and how quickly the focused crawler leads to get top relevant pages. The analysis evaluates a specified page with respect to both crawl and search metrics, which may be the same or different in terms of either the mechanisms or methods used or in terms of the specific keywords or specializations of those methods. A page receiving a high value from the search metric mechanism is likely to be relevant to the input query. A page receiving a high value from crawl metric mechanism is likely to lead to pages that are relevant to the input query.

For evaluating the search metric or the crawl metric value of a page, our focused crawler uses a combination of several techniques. Each one of the techniques returns a numerical value that expresses the relevance of the document based on the particular criteria. The numerical values computed using the different techniques could be computed using any mathematical formula, and the numerical values that result from one technique can be used as inputs to another technique (for example, link-structure analysis such as PageRank can use just link structure information to compute ranks of pages, and then combine these computed PageRanks with similiarity-based relevance information, or the similiarity value associated with a document can be used as part of its 'initial' PageRank to be used as input by the iterative PageRank calculation. Typically, different numerical values are totaled through a weighted sum or multiplied to obtain the overall search metric of the document. Examples of the types of techniques that can be used to evaluate documents are:

Keyword-based content analysis: The input query is allowed to contain a boolean expression of keywords and exact phrases. The keyword-based content analysis determines whether a target page satisfies the boolean expression specified by the query. For example, let the query contain the following boolean expression: "arvind krishnamurthy" AND "firstRain." Then, only those pages that contain the exact phrase "arvind krishnamurthy" and the keyword "firstRain" will obtain a high search metric value.

Structural content analysis: As part of the input query, the user could specify the desired structure of the target pages. The structural specification may specify a desired hierarchical structure to the target pages, or simply the presence of certain structural elements (e.g. in the markup lanaguage), and could also include keywords and phrases that are located in the document or within certain structural confines in the document. A more detailed explanation of this technique is provided later in this document.

Link structure analysis: This analysis involves building a graph representation of documents constituting both fetched and yet-unfetched documents encountered during a focused crawl, or available to the crawler before the crawl was launched. Nodes in the graph represent documents, while edges represent links between documents. A link structure analysis determines the relevance and importance of a document based on the link structure of the graph.

Approximate link structure analysis: This analysis is a variant of the link structure analysis and corresponds to a computation where the full computation performed by the link structure analysis on a larger graph is replaced by an approximate calculation or a calculation on a reduced graph. There are many kinds of approximation that can be employed in the focused crawler of various embodiments. In some embodiments an approximation technique involves building a graph of only a sample of relevant documents and their nearby documents (namely, documents that can be reached through a specified number of forward and backward links) and performing the link structure analysis on this smaller graph rather than on the full graph of all available fetched and yet-unfetched pages or the graph obtained by including recently fetched documents and documents that can be reached from them via any number of forward or backward links.

Timeliness analysis: The search metric could also be computed based on the freshness of a document, which may be evaluated, for example, as the most recent modification time of the document. Document creation is considered to be a type of document modification under this interpretation.

The crawl metric value of a page is computed through a combination of the following techniques:

Keyword-based content analysis: The input query is allowed to contain a boolean expression of keywords and exact phrases. The keyword-based content analysis determines whether a target page satisfies the boolean expression specified by the query. For example, let the query contain the following boolean expression: "arvind krishnamurthy" AND "firstRain." Then, only those pages that contain the exact phrase "arvind krishnamurthy" and the keyword "firstRain" will obtain a high crawl metric value.

Structural content analysis: As part of the input query, the user could specify the desired structure of the target pages. The structural specification may specify a desired hierarchical structure to the target pages, or simply the presence of certain structural elements (e.g. in the markup lanaguage), and could also include keywords and phrases that are located in the document or within certain structural confines in the document. A more detailed explanation of this technique is provided later in this document.

Link structure analysis: This analysis involves building a graph representation of documents constituting both fetched and yet-unfetched documents encountered during a focused crawl, or available to the crawler before the crawl was launched. Nodes in the graph represent documents, while edges represent links between documents. A link structure analysis determines the relevance and importance of a document based on the link structure of the graph.

Approximate link structure analysis: This analysis is a variant of the link structure analysis and corresponds to a computation where the full computation performed by the link structure analysis on a larger graph is replaced by an approximate calculation or a calculation on a reduced graph. There are many kinds of approximation that can be employed in the focused crawler of various embodiments. In some embodiments an approximation technique involves building a graph of only recently fetched documents and their nearby documents (namely, documents that can be reached through a specified number of forward and backward links) and performing the link structure analysis on this smaller graph rather than on the full graph of all available fetched and yet-unfetched pages or the graph obtained by including recently fetched documents and documents that can be reached from them via any number of forward or backward links.

Timeliness analysis: The crawl metric could also be computed based on the freshness of a document, which may be evaluated, for example, as the most recent modification time of the document. Document creation is considered to be a type of document modification under this interpretation.

In the default configuration for our focused crawler, both link structure analysis and keyword-based content analysis is used for computing the crawl metric, while structural content analysis and keyword-based content analysis is used for computing the search metric. However, the focused crawler can be reconfigured by the user to utilize any combination of the rest of the above mentioned techniques for computing the crawl and search metrics.

Figure 2:
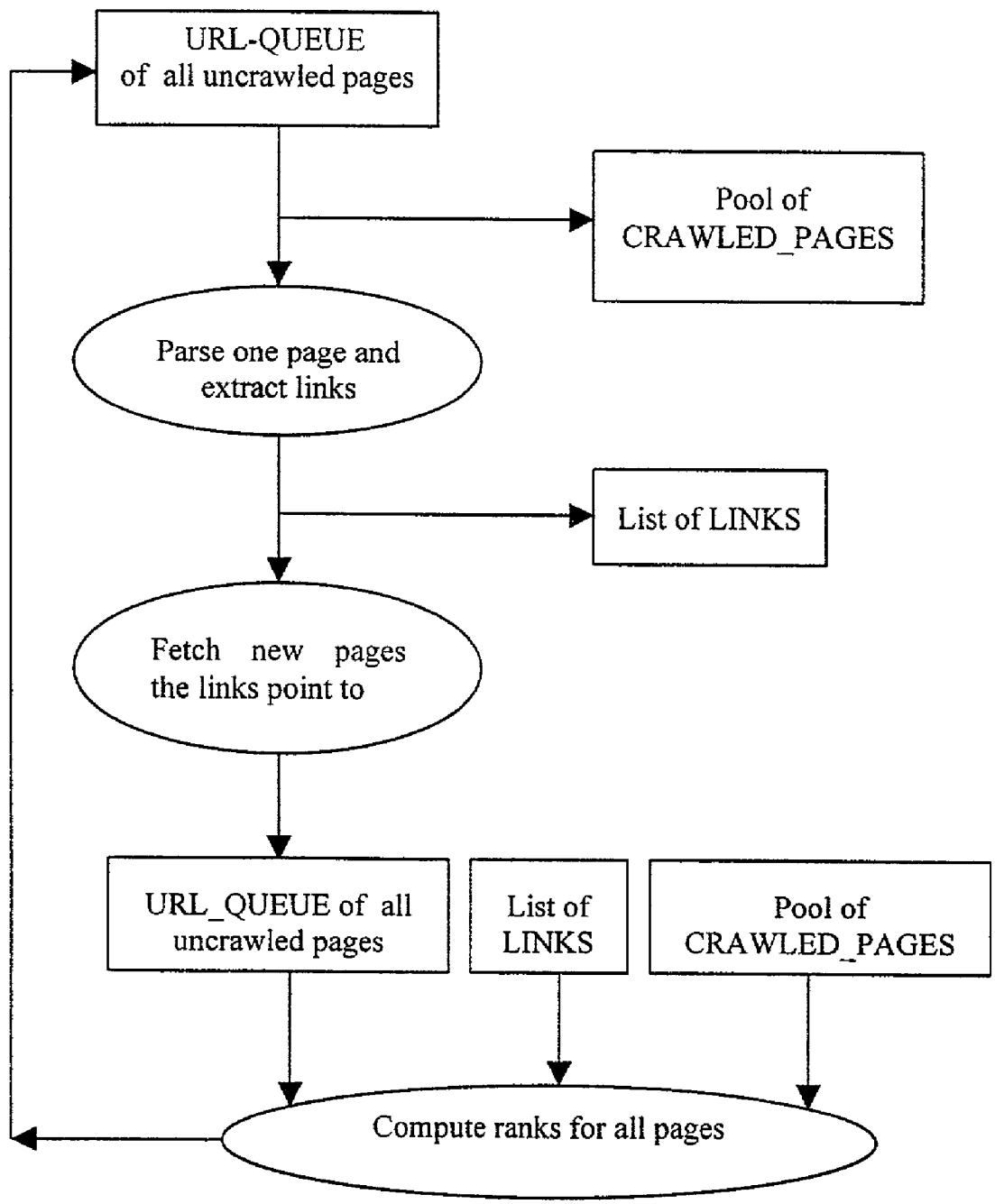
FIG. 2 illustrates one embodiment of basic operation of a Focused Crawler. The boxes are data structures, and ovals are functions performed on data.

The functionality of a basic focused crawler using a PageRank link-based ranking method (together with similarity to the query) can be depicted pictorially as shown in FIG. 2.

The URL_QUEUE keeps all pages that are have been fetched but have not been crawled yet, i.e. their contents have not yet been parsed, so, for example, the links within them are not yet known. The pages in this queue are sorted by a combination of PageRank and similarity to the query and are maintained in sorted order. In this first formulation, the crawler always chooses the next page to crawl from the top of this queue, i.e. the page with the highest rank in the queue. It crawls this page, which implies extracting its links and fetching the pages corresponding to those links, and puts those pages in the URL_QUEUE. The page that has been crawled is moved to the CRAWLED_PAGES pool, and the URL-QUEUE is re-sorted by the combination of the PageRank algorithm and similarity. In general, the CRAWLED_PAGES pool may consist of pages that were crawled in the current focused crawl or it may include pages crawled in previous instances of a crawl for this query or for other, unrelated queries. In the latter case, crawled pages can become stale, and may have to be refreshed or re-crawled after a period of time. The LINKS data structure keeps track of all the link pairs (u, v) such that page u has a link to page v. The link graph of all the pages that have been fetched so far can be derived from this list. Pseudo-code for the basic operation of a focused crawler is shown in FIG. 3.

Extensible Focused Crawling

An extension to a basic focused crawler is an extensible focused crawler. Some embodiments allow a user to override the mechanisms used by the crawler and to add mechanisms of their own instead, and to provide enough hooks in the mechanisms used so that a user may choose from a variety of mechanisms and specialize them in desired ways.

One example is to allow the user to use any mechanism or combination of mechanisms they like for calculating relevance of a document based on its similarity to a query. In addition to adding a new software module that computes keyword-based similarity in a different manner than the default used by the crawler, a user may add a different type of query specification (such as a structural template with or without keywords, a natural language query specification, a means of evaluating documents with special types of content or with other media than text in them) and a corresponding module to evaluate similarity with respect to that query. In this example of extensible input specification, the crawler is a common infrastructure that navigates the web efficiently guided by this extensible input. Thus, the overall infrastructure is separated into two parts: an input form and similarity metric specified by the user, and an efficient crawler with built-in analysis and navigation algorithms. The analogy here is with a car and a driver. A car provides a lot of common technology, terrain negotiation, etc., while the driver knows how to guide the car and can do so in any desired fashion limited only by the fairly rich set of interfaces provided by the car. Drivers are good at knowing where they want to go, what they are looking for, and how best to guide themselves and the car to get there; cars are good at getting them there under their guidance, using basic automotive technology, terrain negotiation, and preprogrammed automatic directions. The extensible crawler thus decouples two areas of expertise: the crawler's expertise in navigating the link and similarity terrain, and the user's expertise in defining the targets and the methods by which to take at intermediate points in response to observed events.

Even in the case of text-based document evaluation for similarity, inputs can be specified in several ways. In the simplest case, users can provide as input a word, phrase or Boolean query. Another example is a user defining a template of what they are looking for—for example a template for a resume, an online advertisement, or an image or other document of a certain type—and the crawler crawling the web to find pages that match those templates well. Allowing the type of query specification and the metric used for similarity evaluation to be modified or flexible has many advantages. For example, a keyword search for resumes of Ph.D.s in Computer Science as likely or more to return job postings for Ph.D.s in computer science than their resumes, since both have the keywords in them. However, a template-based focused crawl will return resumes, since resumes look very different in structure than job postings. As discussed earlier, it may be desirable to provide two or more 'similarity' specifications: one that is used to judge the similarity of a document to the target specification that is being sought (e.g. a template or a keyword query), and another that is used to guide the crawl by helping to rank pages as crawl guides rather than as targets/destinations (e.g. resumes don't usually point to other resumes, so a resume template may or may not to be used to find pages that are good candidates for leading the crawler to other resumes). Still another example of a query is one in which a user provides a set of example pages that have content similar to what is being sought, and either the user or the crawler infrastructure also provides a classification method to classify pages according to their similarity with the examples and compute a rank based on that classification.

Separately from specifying a similarity measure (to be used as a search metric or as part of a crawl metric), a user of an extensible crawler may also specify what combination of mechanisms should be used in each of a search metric or a crawl metric; for example, whether only keywords, or keywords and templates, or keywords and link structure, etc. A user may also specify or specialize some of the runtime methods used for guiding the crawl. For example, a user may specify which types of documents similarity metrics are to be evaluated against (e.g. whether only the document itself should be evaluated or even documents that point to it, or anchor text associated with links that point to it, or documents or anchor text associated with links that point to it only indirectly, e.g. in or within a specified number of steps). A user may also specify how much, if any, approximation to use in the use of an approximate link-structure based crawl metric or search metric (e.g. how many links to follow in the forward direction or backward direction in expanding the graph), whether or not link structure or some other mechanism should be used in either case, and details like how deep to go along certain types of link paths that are encountered, how long to pursue a path before turning back, etc. In some embodiments, an extensible crawler gives a sophisticated user control over not only the specification mechanisms but also parameters of the underlying methods and even over the methods used themselves, so that the crawler can be easily extended to new applications as well as to deliver better results in a given application, and so that a user knowing the domain of application can enable crawls to be performed in the best possible way.

Issues in Using Link-Structure Based Ranking in the Focused Crawler

When a link-structure based rank such as PageRank is computed during the process of crawl, as described in FIG. 2 only a subset of pages that the crawler will ultimately return or touch are available to the algorithm, the size of this subset increasing as the crawl proceeds. Thus, the rank computed for each page at any stage of the crawl is simply the current estimate of its final rank based on the information available so far. Note that what really matters for the progress of the crawl is to update the ranks of the pages in URL_QUEUE that have not been crawled yet, which (using a rank based on, say, both link structure and similarity to the query yield the actual link-structure-plus-similarity based rank of the page) determines which page should be crawled next. Computing these ranks using all the available link-structure information, however, requires that the already crawled pages (CRAWLED_PAGES) be included in the iterative calculation as well, since these crawled pages may be linked, directly or indirectly, to pages in the URL_QUEUE and since they may be needed to preserve the integrity of normalization across multiple PageRank calculations as more pages are crawled. It may also be important to update the ranks of the already crawled pages as well, because they may distribute their weights to future pages that have not been crawled yet, and thus affect the order of pages in URL_QUEUE later on. Thus, all pages that are available so far, whether fetched but not crawled or crawled, may be included in the graph on which a PageRank or PageRank-like calculation is computed at any given time. [the word PageRank can refer to link-structure based algorithms that compute ranks or weights for nodes in a graph based on the link structure of the graph, for example via an iterative computation on the graph. PageRank as discussed earlier in this document is one example of such an algorithm, but the word can refer to the more general case. Thus, for example, even if the ranks or weights assigned to nodes of the graph include information beyond PageRank that is not included in the original PageRank algorithm, such as similarity information, the algorithm can be referred to as PageRank and the weights as PageRanks for simplicity and concreteness.]

Including all pages, unfortunately, has a performance problem. As the crawl proceeds, the size of URL_QUEUE and CRAWLED_PAGES increases quickly. As a result, computing PageRank for all these pages becomes increasingly expensive. Suppose the crawler has fetched N pages. The computation time in each iteration in the iterative system scales linearly with N. The time it takes for the iterative system to converge scales as log N. Therefore, the total PageRank computation time in crawl scales as N×log N. Our goal in each PageRank calculation is to rank the recently obtained links in the URL_QUEUE whose corresponding pages have not yet been fetched, since an order of importance in which to fetch those pages can be determined. This number of pages is much smaller than N, and does not grow much as the crawl proceeds, while N does. Since successive PageRank computations become more expensive as each new page is crawled, the focused crawler may become too time-consuming (and wasteful of computation) to be used effectively.

Thus, a problem for a focused crawler guided at least in part by a link-based or other potentially expensive page ranking algorithm is to find a tradeoff between the following two goals: (i) quality: since a focused crawler crawls dynamically in response to a query or input, it needs to be well-guided toward high-quality pages and should endeavor not to crawl a lot of low-quality pages with regard to that query, and (ii) performance in terms of pages fetched per second. Since algorithms that guide a crawler toward high-quality pages can be expensive, one tradeoff is between the number of pages fetched per second and the quality of the pages with regard to the query. The goal is to optimize for quality per second, which is the product of quality per page and pages per second. A simple crawler, for example one that simply crawls all the links on every page it fetches, will do well on the pages per second metric, but not well on the quality per page metric. A focused crawler using a full PageRank or PageRank-like algorithm (together with content similarity) to guide the crawl will do well on quality per page but potentially poorly on pages per second, especially as the crawl proceeds. Building a successful compromise algorithm also requires achieving a balance between the speed or utilization of the processor and the network. Starting from a full PageRankbased or PageRank-like ranking algorithm, which provides high quality per page but low pages per second, our goal is to improve the pages per second by both reducing the processing load and balancing the processor and network activities, but without compromising quality per fetched page much.

Some embodiments address this problem. However, let us first discuss a couple of other important issues with regard to using PageRank-like or link-structure based algorithms with a focused crawler.

One issue with using a link-structure based ranking algorithm with a focused crawler is whether the ranks computed for pages should be obtained by factoring similarity of pages explicitly into the link-based iterative PageRank calculation, or whether PageRanks should be computed independently of similarity (based only on link structure of the crawled pages, even though what that set of pages is is guided by the query) and the overall rank of a page obtained by combining the link-based PageRank with a measure of similarity of the page to the query. In one example implementation of incorporating similarity explicitly into the PageRank calculation itself, the distribution of PageRank from a parent page to the (child) pages that it links to may be based on the similarity of each child to the query instead of being equally divided among the children. Alternatively, the transfer of prestige from a page to another (via a link) can be weighted by the similarity of the source page to the query, or by the similarity of the anchor text of that link, of the link itself, or of the portion of the source page in which the link occurs (rather than by the similarity of the destination page as in the previous method; of course, the resulting similarity-weighted PageRanks would have to be normalized). Also, the final scores, which include link-structure based as well as similarity-based ranks, computed in one instance of the computation can be used as the initial scores or weights of the corresponding nodes in the next instance of the calculation. By this or other means, before the graph calculation is done (via link structure), a page's rank might already be weighted or augmented by its similarity score in some fashion (for example by multiplying the two), and these combined ranks might be what is propagated among nodes by the graph calculation. Different situations might call for different approaches to be used in this regard. For example, if the focused crawler maintains a database of crawled (and indexed) pages and starts from that database rather than starting to crawl from an empty set, the PageRanks of the pages in the database may be stored with the pages rather than re-computed every time a crawl is initiated. In this case, it may be much easier to store generic PageRanks for the pages rather than query-specific ones, especially if the crawler accepts different queries on different subjects. Our crawler allows different combinations of these techniques to be used.

If PageRank is computed separately from similarity and the two are combined at the end (i.e. similarity scores are not included in what is propagated in the PageRank calculation), a second issue is whether link-based PageRank should be given higher or lower priority (or weight) than the computed similarity to the part of the query that guides the crawl, when computing a combined score for evaluating which page to crawl next. A simple method is to multiply PageRank with similarity. However, a crawler might want to weigh similarity higher than PageRank. One way to do this is to implement the URL-queue as a set of queues, each holding pages with different levels of similarity to the query (for example, similarities between different thresholds). Pages to crawl may be chosen from higher-similarity queues before choosing pages from lower-similarity queues (using thresholds and PageRanks as well to avoid too strong biases). Within a queue, PageRank and similarity together may be used to rank the pages within that queue. Another way is to weight similarity more heavily in either combining generic PageRank with similarity score or incorporating similarity deeply into the PageRank calculation itself, as discussed earlier. Other methods can be used depending on whether similarity or link-based PageRank are to be given higher weight in guiding the crawl.

A third issue, even in the absence of maintaining a database of pages as the starting point for a crawl, is whether PageRanks should be computed from scratch in every step of the crawl (i.e. when more pages are fetched and re-ranking is needed) or whether they should be maintained and updated incrementally from one step to another. One round of PageRank computation during the crawl may change the PageRank of some uncrawled pages in the URL_QUEUE, while the next round of PageRank computation (after some new pages are fetched) may change the PageRank of some other uncrawled pages in the URL_QUEUE. When these pages are reordered in the URL_QUEUE based on their updated PageRank, the PageRanks computed in different computations can be normalized so that they can be compared. One straightforward solution is to always compute PageRank from scratch at any time in crawl, given the current link structure of all the pages seen so far. This "stateless" solution assumes no inheritance of PageRank knowledge from previous computations. Instead, all it knows for sure is the current link structure of all the pages seen at this point of crawl. It then puts all these pages into the iterative system to compute. However, this may not work well for some approximate PageRank algorithms.

Improving Performance by Reducing Processing Load

Re-computing the PageRanks of all pages seen so far (i.e. all pages in the CRAWLED_PAGES pool and in the URL_QUEUE) every time is very expensive. Reducing the number of pages included can be desirable, without greatly impacting the quality or integrity of the PageRank calculation. To do this, our first observation is that the PageRank computation propagates rank directly only in a forward direction. That is, if page A links to page B, A transfers authority to B but A's authority does not change simply by virtue of pointing to B (of course, B may transfer authority to A if it points back to A directly or indirectly through other pages). This means that a given page is crawled and the pages fetched that the given page points to (putting them in the URL_QUEUE), PageRanks may not need to be re-computed for all the pages seen so far, but only for those that can be reached by links coming out of the pages that were just fetched (whose URLs are in the URL_QUEUE), either directly or through other previously crawled pages. (Of course, not all of the pages that are reachable from the pages that were just fetched are by no means guaranteed to have been seen yet—i.e. to be in the set of CRAWLED_PAGES or in the URL_QUEUE—it is quite possible that a particular page in the set of CRAWLED_PAGES is not reached by the method above, but would have reached it if all reachable pages from the links above were already fetched or available, since one of those unknown pages may have contained a link to that page. This can be a side-effect of having to determine which pages/URLs to crawl from next without having full knowledge of the set of all pages that might ultimately be touched or crawled.) Then a PageRank computation can be performed for only this subset of pages, which is hopefully much smaller than the entire set of pages seen so far.

The problem with including only these pages is that to preserve the integrity of the original PageRank algorithm, leaf nodes of the graph (i.e. nodes that do not point to any available page) can be given artificial links to all the existing pages in the system (i.e. in the CRAWLED_PAGES or in the URL_QUEUE), whether or not those pages are reachable by following links forward from the set of 'recently fetched' pages. As an approximation to the use of the original PageRank method in this context, instead of using the entire set of pages from the CRAWLED_PAGES and URL_QUEUE in the graph, for the purpose of including artificial links in some embodiments we include only those pages that are obtained by following links backward from the pages that have been recently fetched upto a limited extent (a certain number of links, say), and then include artificial links from the leaf nodes of the graph to all of these pages.

In this case, different PageRank computations (done as new sets of pages are crawled) include different sets of pages, and their results can be directly comparable since they are used to rank pages in the URL_QUEUE relative to one another. Thus, using a stateless approach (starting from a blank slate) in each PageRank calculation will not work, for normalization and comparability reasons. Instead, we want to keep the state, or each page's PageRank from one PageRank computation to the next. Thus, we can regard the process of computing PageRank at any point in the crawl as the following:

1. Identify a set of pages containing the freshly (or recently) crawled pages (for example the top-ranked pages in URL_QUEUE), and optionally the pages that these pages links to directly. Let us call this the seed set;
2. Extract a sub-graph from all available pages containing those pages that are connected from this seed set of pages at any distance (if there exists a directed path) in the forward direction, and to a limited distance extent in the backward direction, as discussed earlier;
3. Perform a PageRank computation on this sub-graph. Each page uses its PageRank inherited from the last PageRank computation in the crawl as the initial value (perhaps qualified with the similarity score of the document). For newly fetched pages that do not have such initial values, they effectively simply get a PageRank conferred to them from their parent page;
4. When the computation is done, we may normalize the PageRanks for all pages to ensure that the sum of all PageRanks so far is 1.

Note that where the actual page contents are available for all the pages included in the computation, similarity of pages to the query can be computed with regard to full-page text rather than simply the anchor text associated with links, if so desired.

By this method, each page receives an incrementally updated PageRank every time the PageRank computation is invoked during the crawl, until at last it gets its final PageRank at the end of the crawl. Using an incremental update approach also has a potential performance advantage over starting from scratch each time. Note that the conferral of authority (PageRank) from a page decays very rapidly with increasing distance from the page, since a page's authority conferral is divided among all the pages it points to. This suggests that inserting a new page(s) into a graph, as we do between successive computations, should not affect many pages' PageRanks significantly. Therefore, the PageRank inherited from the last computation in the crawl is likely to be a good guess for the initialization of the current computation, and may help the iterative system to converge faster.

Of course, the final PageRank that each page obtains via these repeated incremental computations may not be exactly the same as the stateless PageRank computation would produce if it were invoked in the last of the computations, which is the final PageRank of the page. This, however, is not a problem for guiding the crawl, since what matters at any given time for guiding the crawl is the relative PageRank of the different pages in the URL_QUEUE. Toward the end, the incremental PageRank computations during the crawl may provide us with a close approximation of the real PageRank that would be computed from the full graph at the end. Keeping PageRanks normalized at every step may be helpful in allowing subsequent steps to converge more quickly and reliably.

Even following the links to identify all pages whose PageRank might be affected can be time-consuming. We can reduce the cost without compromising quality much by taking advantage of the fact that authority conferral falls off quite quickly with path length (especially since pages tend to link to many other pages and authority conferral from a source page to a destination page is inversely proportional to the number of pages that the source page links to). This affords us the opportunity to make another cost-performance tradeoff by using an approximation. The goal is to not include in the PageRank computation all already-seen pages that may be reached by following links from the new pages, but rather only a well-chosen subset of those. As a simple example, instead of propagating links all the way to find all pages seen so far that might be affected by the newly fetched pages, we simply propagate links from the newly fetched pages to a fixed "depth" or path length (sayx steps) into the set of pages seen so far Oust as we did for backlinks for the purpose of introducing artificial links to leaf pages). Only the pages touched in this way are included in the PageRank computation, along with the pages reached by traversing backlinks as discussed earlier.

The process of computing PageRank is then modified to the following, in which only step 2 has changed from the earlier version:

1. Identify a set of pages containing the freshly (or recently) crawled pages (here the top-ranked pages in URL_QUEUE), and optionally the pages that these pages link to directly. Let us call this the seed set.
2. Extract a sub-graph from all available pages in the following way: Include the pages in CRAWLED_PAGES that are directly linked by the seed set of pages from step 1. From these chosen pages, continue picking up pages in CRAWLED_PAGES that are connected by them within distance of x. Finally, from all these pages selected so far from CRAWLED_PAGES, we also include the pages in URL_QUEUE that are directly linked by them. Similarly, from the set of pages from step 1, pick up pages in CRAWLED_PAGES that are connected to them within distance of y links in the backward direction.
3. Perform a PageRank computation on this sub-graph. Each page uses its PageRank inherited from the last PageRank computation in the crawl as the initial value. For newly fetched pages that do not have such initial values, they simply get a PageRank conferred to them from their parent page;
4. When the computation is done, we may normalize the PageRanks for all pages.

This is clearly an approximation to doing a full PageRank, with the accuracy of the result and the computation time being traded off via the value of x. By doing approximation in these ways, we hope to compute a relatively small sub-graph each time. Suppose the size of the sub-graph is n. The total PageRank computation time then scales as $n \times \log n$. Because $n \ll N$, the computation time during crawl is reduced dramatically. Experiments suggest that small values of x and y suffice to obtain good performance without sacrificing much in quality.

Other methods of approximation that include only a subset of pages can be used; for example, instead of stopping the traversal to determine inclusion at a fixed depth x from the new pages in the forward direction, a threshold in authority conferral (i.e. including pages further down paths where more authority is being conferred and less far down paths where less authority is being conferred). Similarly, alternative methods can be used in the backward direction as well.

Note that the incremental PageRank computation and its approximation algorithms still incur a cost to do the normalization at the end of each computation. Computing the normalization requires the PageRanks from all pages, which contributes an additional cost proportional to N. In practice however, we can amortize this cost by keeping a histogram of all the normalization factors from computation to computation, and not actually applying them to the pages that are not involved in a given computation. The accumulation of this normalization factor applies to those n pages that are chosen to be included in the iterative system for a computation. Thus, this additional computation cost can be eliminated.

Improving the Quality of Approximate PageRank Algorithms Using Lookahead or Page Prefetching One problem with the reduction in graph size accomplished by the approximate algorithms is that computing PageRank for a sub-graph may not converge if the sub-graph is not well connected enough. Also, it is important that approximation algorithms come close to the full algorithm in assigning PageRanks to most of the "hub" pages (pages that point to a lot of other high-quality pages), since these pages are very important in determining the ranks of future pages that we haven't seen so far. This aspect of the approximation algorithms would be helped if we had some 'look ahead' into to the link structure that we haven't seen so far.

One way to extend the approximation algorithms is to prefetch some pages in order to extract more link information. What we really do is to pre-crawl and prefetch the pages linked by the set of the pages obtained in step 1 in the incremental algorithm, if they have not been fetched yet. We continue this pre-fetching by following links for k steps. These pre-fetched pages, however, are not included in the sub-graph for PageRank computation. Instead, they are simply used to derive linkage information, and only the effect of the links is included in the sub-graph. In particular, if there exists a directed path from the top page in URL_QUEUE, through the pre-fetched pages, to pages that are either in CRAWLED_PAGES or URL_QUEUE, we consider that there is a direct link between the top page in URL_QUEUE and those pages. Note that the links discovered or added through the pre-fetching are not inserted into the LINKS data structure either, since they are only temporary for the current computation.

While the pre-fetching extension builds a more richly connected sub-graph for the approximate computation and thus helps it converge, its advantage and applicability go beyond the incremental PageRank computation and its approximation algorithms. Some embodiments computing PageRank while crawling with a focused crawler is to predict the importance of a page based only on the information that we have so far, to therefore guide the crawler better. Pre-fetching helps to predict better.

Improving Performance Further: A Non-blocking and Speculative Focused Crawler

In the basic crawling algorithm, there are two major active components: fetching pages from remote servers and computing PageRank for pages that have been fetched. Even though these two different components mainly consume different resources—network and CPU, the cross-dependency between them in the algorithm keeps neither of the resources from being fully utilized. The crawler described so far can be considered to use blocking computation and page fetching; in particular, a page is chosen from the URL_QUEUE to be crawled next, and only the pages corresponding to the links on it are fetched; the crawler then waits for all these pages to arrive before it computes the PageRank again. In this case:

a) Computation blocks until all the requested pages are fetched (during, for example, step 1 and 2).
b) Fetching pages from the network is blocked until the previous computation finishes and identifies which page to crawl next (during, for example, step 2 and 3).

Figure 4:
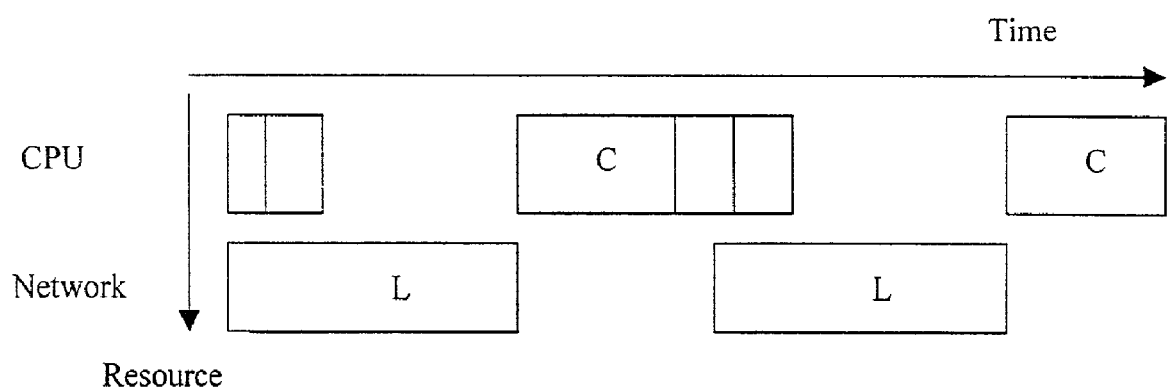
FIG. 4 illustrates one embodiment of dependences in original blocking focused crawler.
Figure 5:
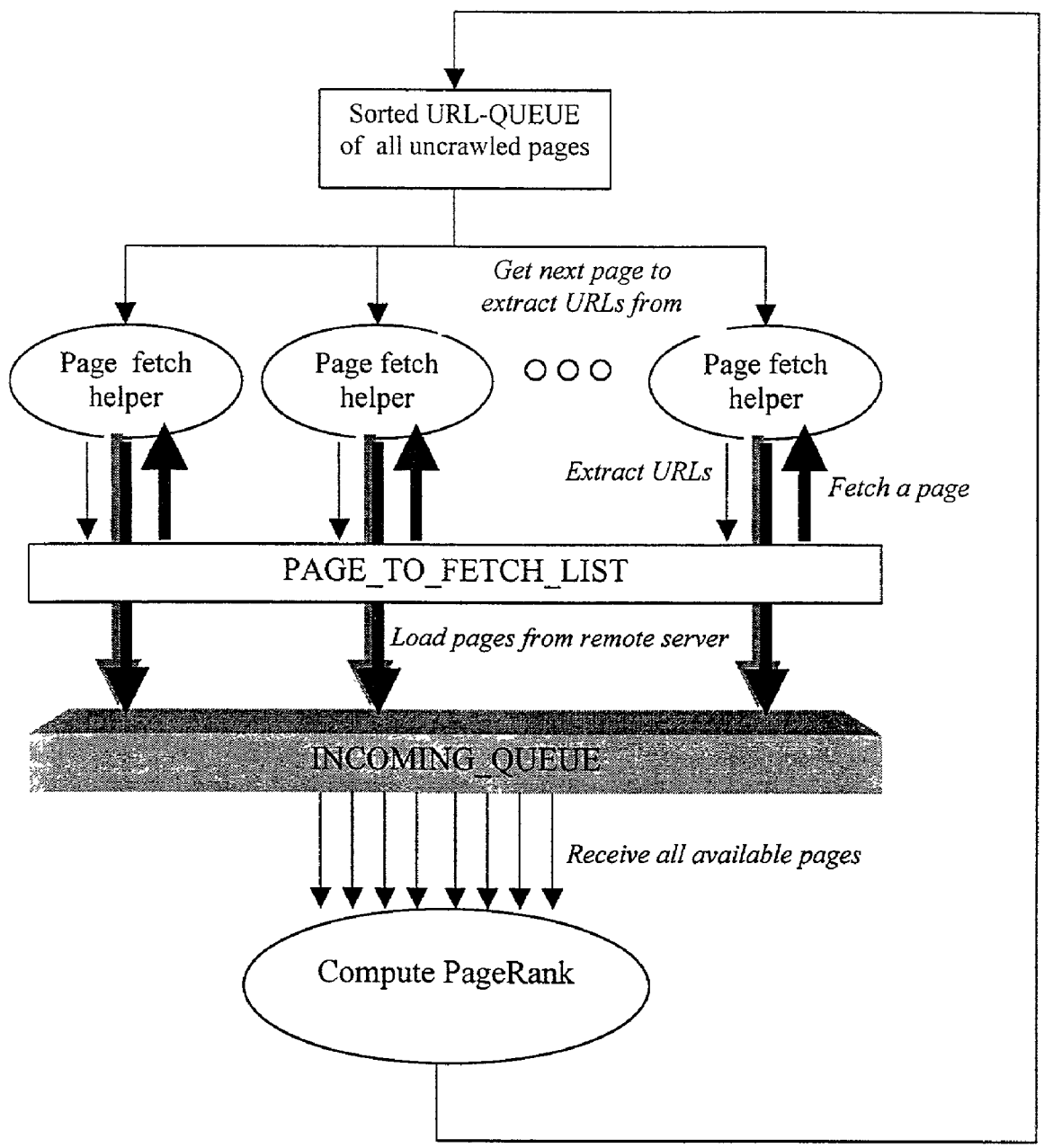
FIG. 5 illustrates one embodiment of a non-blocking, speculative crawler.

The cross-resource dependencies and blocking can be depicted as in FIG. 4:

Clearly the CPU and network resources stay idle when they have to wait for the results from the other resource (the blank regions along the horizontal time-lines for each resource in FIG. 4. Especially if the computation thread and the page management and fetching do not interfere with one another for access to resources (e.g. the CPU or memory), for best performance we might like to have network and CPU be utilized towards their full capacities and in parallel as much as possible. To do this, we can separate the thread in charge of the main computation from a set of threads in charge of managing activities related to page fetching and the network. The main computation thread repeatedly takes available pages from the incoming queue, performs the PageRank computation using those pages and the chosen approximation method, and sorts the URL_QUEUE according to the computed PageRanks. As soon as it is done with one computation cycle of PageRank and sorting the URL_QUEUE, it is ready to start the next one, so it dequeues the incoming pages from the incoming queue. FIG. 5 depicts a possible structure for non-blocking speculative crawler. If the growth rate of the computation time is less than proportional to the number of new pages introduced in this way, taking as many pages as possible off the incoming queue is a good tradeoff to make. The page helper threads continually perform the following activities: obtain a URL(s) from a PAGE_TO_FETCH list; fetch the corresponding page(s) from the network; when there are no more URLs in the PAGE_TO_FETCH list, take a page(s) from the URL_QUEUE, extract URLs from it (them) and put the URLs in the PAGE_TO_FETCH list.

Thus, the computation thread and the helper threads can be viewed as performing their assigned tasks repeatedly and mostly independently as fast as possible, except that they are each guided by the other side in terms of what inputs the other side has made available to them at any given invocation. This is the non-blocking aspect of the focused crawler. The speculative aspect is that there is no synchrony between the computation thread and the helper threads: The helper threads take pages off from the URL_QUEUE in rank order as far as possible, but they do not wait for the computation thread to compute new ranks; rather, they simply use the ranks as computed in the previous computation and available in the queue, which may no longer be optimal. In particular, the helper threads simply fetch pages corresponding to URLs from a PAGE_TO_FETCH list, and when these are exhausted they take pages (in rank order as far as possible) from the URL_QUEUE, extract their links and put them in the PAGE_TO_FETCH list. If the URL-QUEUE is resorted in the meantime, this does not affect the order of the pages currently in the PAGE_TO_FETCH list. Pages may thus be selected for fetching in a different order than if only one page were taken from the URL_QUEUE between re-rankings, so the order in which pages are fetched may not be optimal. However, the goal is that these pages are likely to be needed soon; so available network bandwidth is used to effectively prefetch the pages.

Many variations are possible on implementing the non-blocking, speculative crawler. For example, the continuous progress of the computation thread and the helper threads can be throttled either by one another or by thresholds in the number of pages that are de-queued from the incoming page queue or fetched from the PAGE_TO_FETCH list. This throttling, as well as throttling the speed of the fetching by the helper threads, may be valuable if there is significant competition for resources between the computational thread and the helper threads, if the computation cost becomes greater than linear in the number of pages introduced after a point, or if quality is lost by introducing too many new pages to the PageRank computation at a time that may not be optimally ranked. Also, while in the description above the helper threads exhaust the current PAGE_TO_FETCH list before going back and examining the re-ranked URL_QUEUE, the management of which pages to fetch next can be handled differently.

Structural Content Analysis

Now we discuss structural content analysis, which is a novel aspect of our focused crawler. Structural content analysis refers to analysis of crawled documents while computing the crawl and search metrics, where the documents' contents is analyzed to check its similarity to a predefined structural template (possibly in combination with other methods). We provide an example of such a template within the context of specifying resume documents and later discuss some of the issues in implementing structural analysis.

A user can specify a crawl for computer science graduates with experience in database management using the following template:

Education:
 "computer science" AND (B.S. OR "Bachelor of Science")
  Experience:
   "database management" OR "database maintenance"

The template specification therefore consists of a hierarchical specification of structure and content. In this example, the template specifies a two-level hierarchy comprising of a heading field and a content field for each heading. In addition, it specifies the desire that Pi the resume contain "Education" as one of the heading fields, and that the content corresponding to this heading satisfy the following boolean expression of keywords and exact phrases: "computer science" AND (B.S. OR "Bachelor of Science"). The template can be defined so that these desires are requirements or simply desires. It may also be defined so that the Education and Experience sections can appear next to each other, or in the particular relative order shown, or that they simply appear and the order between them is unimportant. The template is a detailed and rich specification of the nature of target pages, using not only keywords but also structural information.

The template matching algorithm checks whether a target document matches a given template specification. A novel aspect of the algorithm is that it allows documents with arbitrary presentational properties to be excellent matches for the template specification as long as the required hierarchy of content items is present in the document. For example, any of the following documents would match the template query:

a resume containing HTML list formatting commands for the headings and simple paragraphs for content associated with the headings
 a resume containing HTML list formatting commands for the headings and nested lists for content associated with the headings
 a resume presented in the form of a table with column or row headers signifying the top-level of a hierarchical specification and the column/row data cells signifying the content in the second-level hierarchical specification.

One embodiment of a template matching algorithm is one that identifies repeating structures within the target document and tries to match the repeating structures to the template specification. This process is performed recursively starting with the top-level of the hierarchical specification and proceeds to subsequent levels once a correspondence is found between a certain level of the template specification to the document structure. The algorithm reports a partial match score if the document does not exactly match the template specification. We now present a high level description of various steps of this algorithm for HTML documents, which are one type of document to which a template matching algorithm may be.

1. Access a parsed HTML tree for a target document.
2. Walk through the parsed HTML tree in a preorder traversal, and number text nodes in ascending order. At the same time, look for text nodes that contain any key word from the first level categories in the template, such as "experience" and "education", and label those nodes with these key words. If a node contains multiple keywords, it is labeled by all the keyword contained in the text node.
3. For each keyword that labels some text node, we keep those nodes that contain the keyword and are closest to the root of the parsed HTML tree.
4. Now we label the text nodes left from step 3 with both their distances to the root of the parsed HTML tree and the tag of their parent nodes.
5. In the labeled nodes from step 4, we keep the nodes that have the most popular tags T and the shortest distances to the root of the parsed HTML tree. If there are no such nodes left, this page is not regarded as a target document.
6. If there are nodes left after the previous pruning operations, we pick up two nodes from Step 5, find the nearest common ancestor in the parsed HTML tree for these two nodes, and determine the distance d from the nearest common ancestor to these two nodes.
7. Find text nodes whose parents have the tag T and a distance d+1 from the nearest common ancestor.
8. The text nodes found in Step 7 correspond to the first level categories of the template. Other text nodes that are not in this set are regarded as texts in the second and subsequent levels and are bound to the first level text node that is their left-most sibling in the same sub-tree. In terms of the preorder numbering, text nodes whose preorder numbers fall within the range defined by two first level text nodes are considered as secondary text nodes bound to the closest first level text node with the smaller preorder number.

9. For those first level categories that have keyword-matching requirements for the second and subsequent levels (for instance, "education" with keyword "computer science"), we check whether the secondary texts under any matching first level text nodes for "education" contain these keywords.

10. This process is repeated for the various levels of the template hierarchy.

The template matching analysis could be implemented for a variety of document types, such as resumes, product specifications, technical papers, and financial reports. Furthermore, the matching algorithms are applicable to documents that are formatted using any kind of markup language.

Similarly, template-matching algorithms exist in our crawler to cover presentational information as well as or instead of purely structural information in the underlying markup language representation of the document. For example, based on knowledge of the rendering method, one can specify as a template elements (described somehow, using keywords, structural information or other methods) that should appear close to one another or bear certain relationships to one another when displayed or otherwise presented.

Choosing Starting Points

The choice of starting points for a focused crawl can be very important to the crawl's success and efficiency. One possibility is to rely on a user to provide good starting points. Another approach is to have the crawler find good starting points by itself. One way to do this is to first search online directories and search engines, and find a good, perhaps sizeable, relevant set of pages. These page links may all be inserted in the URL-QUEUE, and sorted by similarity and PageRank to serve as starting points. However, the results obtained from an online directory or search engine might not be very useful in uncovering other pages that match the search criteria. For example, if one would like to find pages that provide technical information on "focused crawlers", an appropriate query to a search engine might return pages corresponding to technical papers, which are likely to cite related work in the area and are therefore good leads to find more information on the subject. On the other hand, the search engine might also find pages of companies interested in building and marketing focused crawlers. Such pages are unlikely to provide links to other players working in the same field, and consequently, are not good starting points for initiating crawls. In general, results from queries on search engines by themselves are not good candidates for starting points.

We therefore take an approach that is inspired by the following observations and utilizes the search results in an indirect fashion. First, some of the pages returned from querying a search engine or a database containing previously crawled pages are likely to be authoritative pages for the given query. Second, a page that points to such authoritative pages is likely to lead to other useful pages as well, and these pages are essentially the "hubs", using Kleinberg's terminology (cite: *Authoritative sources in a hyperlinked environment*), that an hubs-and-authorities algorithm would identify. Therefore, from the crawler's point of view, we would prefer using hub pages as starting points to reveal other authoritative pages. The degree to which a hub page is a suitable candidate for being a starting point depends upon the number of useful pages to which it points.

To bootstrap our analysis, we need to find pages that link to the initial set of target matches obtained from a search engine query. Assuming that we could identify the pages that point to the results returned by the search query, we could perform an hubs-and-authorities computation over the entire set of query-relevant pages and the pages that point to them, and use the pages with high hub scores (weighted by similarity) as starting points. To identify pages that point to the results returned by the search query, we could again employ an online search engine operating on top of a database of pre-crawled pages. The query this time would be to find pages that contain links to the results from the original search. In effect, one could describe this entire operation as a single-step "reverse crawl" followed by an execution of the hubs-and-authorities algorithm to find the most relevant pages that link to a larger number of pages that match the original search criteria.

However, since the backward links are obtained from a database that contains only a partial snapshot of the web, we are very likely to get only a subset of the pages that link to our initial set of search results obtained from the database. To overcome this limitation, we can go backwards one more step to get another set of pages that point to these "backlink" pages. This operation is motivated by the idea that pages that point to these "backlink" pages may be able to get new "backlink" pages that were not available from the search engines' databases. In general, one could employ the reverse crawl technique to obtain pages that provide us with a bigger coverage and better starting points that would lead to a larger set of relevant pages. This process could be repeated in a recursive fashion to identify starting points that are more potent in leading the crawler to a large number of useful pages. However, there is a clear trade-off in performing these reverse crawls since they eventually provide pages that are not particularly related or relevant to the focused crawl, but just happen to provide a traversal path for the crawler to some relevant page. These pages are not good starting points.

We have empirically studied the quality of the hub-pages uncovered by such reverse crawls, and in practice, the quality and relevance to the crawl decays after three applications of the reverse crawl. Consequently, our focused crawler identifies the top twenty authoritative pages from search engines or directories, performs three steps of the reverse crawl, and then crawls three steps in the forward direction. The linkage graph obtained from this process is sufficiently comprehensive to be analyzed to derive pages in the graph that are most effective in leading the crawler towards relevant pages.

This general mechanism of performing analysis on the linkage graphs obtained from reverse crawls can also be applied in the following contexts to enhance the performance and functionality of the crawler:

Inferring crawl metrics: This whole process of performing reverse crawls and identifying pages that are likely to generate search results is also useful in identifying the "crawl metric". The crawl metric is an indicator value associated with a page that can be used to characterize the likelihood of obtaining search results as a consequence of crawling the links embedded in the page. If a page has a high crawl metric, we should enhance the priority associated with exploring its outward links. One could analyze the hub pages in the linkage graph from the perspective of identifying similarities in occurrences of common keywords and HTML structures to distill a crawl metric to capture the page's utility value to the focused crawler. This metric could then be used during the lifetime of the crawl to guide it towards sites that contain a sizeable number of relevant pages.

Dynamic reconfiguration of a crawl: By examining the ranks and similarities of the pages crawled so far, the focused crawler can tell whether it is indeed getting stuck in unproductive regions of the web and is not finding relevant pages. This discovery may prompt the crawler to abandon the current paths and use different starting points, either from within its URL-QUEUE, by prompting the user, or by finding better starting points from a search engine or directory as described above. Such detection of getting trapped in a bad area may happen towards the beginning of a crawl due to poor starting pages, or it may happen after a period of relatively efficient crawling during a successful crawl. In the latter case, heuristics can determine when to prompt the user for new starting points, when to simply go on in the hope of getting out of the bad zone soon, and when to choose different, higher-similarity starting points from the URL-QUEUE to initiate another instance of the reverse-crawl based analysis to compute better starting points from pages that have been obtained so far from the current crawl.

Integrating results from multiple search engines: The method of studying the linkage graph to obtain starting points could be extended to construct a meta-search engine, where results from multiple search engines and databases are integrated and presented in a unified form. These results could be used directly without any further processing or used to initiate a focused crawl. What is usually a difficult problem for meta-search engines is the task of merging the results and providing a coherent ranking to the pages from different search engines. Our linkage-graph analysis of reverse crawls allows us to compute uniform importance scores for pages. We can simply get the returns from multiple search engines, crawl forwards and backwards for a few steps from the results, and compute hub and authority scores for all of the pages. We can then simply rank pages based on their authority scores, and can also identify a set of hubs, which are uniformly good and can be used as starting points for the crawl.

Generation and Use of Taxonomies in Focused Crawls

We can also generate taxonomies of a novel type through focused crawling and use them in novel ways in computing crawl metrics, to augment or replace the crawl metric mechanisms considered so far. Other known focused crawlers use a traditional topic-based classification taxonomy to classify pages as they are crawled, and use the strength of classification against desired nodes in this taxonomy to help guide the crawl. Using link structure, we can construct taxonomies, implicitly or explicitly, that are not based on only a topic hierarchy but rather also on a structure of connectedness of pages or types of pages. Such a taxonomy captures and abstracts the logical link hierarchies that contain multiple levels of relationships embodied in 'relays' of links that eventually leading to the targets (e.g. universities point to departments which point to students, which point to home pages, which point to resumes; so this structure or pathway can be captured in a connection taxonomy). In the process of each focused crawl for a certain topic, we are implicitly extracting a focused view or structure of connectedness of resources relevant to that topic from the organization of the entire web or document collection. We can regard this as a taxonomy of connectedness. In this taxonomy, beyond topic correlation we also get another important aspect that indicates the logical correlation of links among resources relevant to that topic. A traditional topic-based taxonomy is valuable in helping human beings to navigate the web. From the perspective of a focused crawler, however, a taxonomy that contains link structure correlations as described above can be important help discover new sources and lead to targets quickly. For example, when crawling for resumes, if we know that department pages are likely to lead quickly to students' resumes (from the taxonomy above), then we should assign department pages a higher value for the crawl metric than pages that are not close to students' resumes in the taxonomy. Thus, the taxonomy of connectedness is another mechanism that can contribute to a crawl metric.

Our model of generating and using taxonomies is to use reverse classifications corresponding to reverse crawl, or crawling using backlinks instead of forward links. Consider how we might build such a taxonomy. Suppose we have a set of known good targets or good pages, given by examples or returned from our repository (or an external search engine) for certain queries, we can find the pages that link to these targets in our repository (or even from some external search engines) by following backlinks when explicitly available or by some other means. We repeat this process for k steps. The pages that have a path to the targets with a distance of i are at the i'th level. Now we have a graph of k+1 levels with page in level i pointing to pages in level i−1 (i.e. in the reverse direction or the direction of backlinks). We use this graph as a training set to construct classifiers for the levels that will determine how to place documents in these levels. The classification can be based on topics, using simple Bayesian models, or obtained from simple extractions of common key words and determining commonality of keywords to construct a taxonomy, etc.

To use the taxonomy as part of a crawl metric (and also to enhance and refine the taxonomy in the process), while we crawl we classify each new page into a set of categories (that fit somewhere in this taxonomy) that may lead to the targets and/or into the category or categories that contain targets. Clearly if the page falls into a target category such as a product page, it is a target. If it falls into the first level above a target category in the link-structure based classification we built, it may be likely to be a vendor's page, and so on. Given a page is classified in a certain category, we put that page into the corresponding prioritized queue of pages/links for that category (i.e. we may now have a set of prioritized URL_QUEUEs from which we rank and choose pages to crawl). We assign priorities to different queues based on factors such as probabilities of a page in category i leading to a page in category i−1, the amount of work needed to reach from one category to the next category in the, taxonomy etc. Ranking of pages within the same queue can be based on mechanisms we discussed earlier. By doing so we are able to generalize the automated generation of possibly multiple-step crawl metrics and merge them into the crawl automatically. To allow feedback in this learning model and adaptive adjustments of the metrics, a reverse crawl can be performed each time (or some of the times) a target is found. This will trigger a new round of reverse classification. In our model of the k-level classifications, each link may not necessarily be physical URL links. They can be a logic link that is translated from multiple-level of physical links, or they can be "content links" that have a lot to do with the key contents in a page indicating specific subjects/topics that this page is about.

At the end of each focused crawl we will have such a taxonomy that is based on both topic correlations and link correlations. This can be regarded as a focused view overlaid on the web for a certain topic such as products in a particular industry. This taxonomy helps us to do focused crawl more efficiently for that particular topic (or topics like it). This method also enables the construction of customized search engines for a particular topic(s) very easily even on top of a general-purpose repository.

Case Studies

This discussion should shed more light on the general mechanisms described in this document and also illustrate some of the specific techniques that we employ for deriving starting points and specifying search and crawl metrics. These are only examples, and do not provide coverage of all interesting combinations of techniques that we have described.

The case studies will be described per representative application. Some embodiments have an extensibility of the crawler and the ability to adapt it to crawl for different kinds of information available from different domains. It should also further motivate the need for a focused crawler as the information sought in each one of these applications are unlikely to be found at a centralized location and also need to be fresh to be useful to the person initiating the crawl. Finally, these applications also benefit from the general-purpose search metrics used by the crawler that allow the user to identify matched pages using both its structure and content.

Finding Resume Pages
  Goal: To build a focused crawler that discovers resumes of potential employees who satisfy certain predefined criteria. For instance, we might be interested in finding candidates with a Ph.D. degree in Computer Science who may graduate in the year 2001.
  Experience with standard search engines: We tried to construct keyword-based queries on search engines to get resumes, Google for instance, but failed. We invariably found job postings rather than resumes because they both tend to have the similar set of key words. Also since job postings usually have higher PageRanks as they are usually found on corporate web sites, the resume results were frequently over-shadowed.
  Search metric: Since a focused crawler has an extensible module for specifying search metrics, we use a "template" to characterize the target pages that we are looking for. A template specifies both the structural and the content of relevant resume pages. A sample template used in our crawls is available at: http://www.c-s.princeton.edu/~dj/template.html. A template for resume pages might specify that the target page needs to have section headings such as "education", "experience", and "publications", and might further specify keywords that need to be found in the information associated with these headings. The template mechanism, therefore, provides a very general-purpose method for identifying whether a particular page is likely to be a resume page.
  Starting points: Since it is difficult to obtain many resume pages from search engines and directories, it is hard for us to get starting points automatically as we described. However, we know that resume pages tend to be pointed by people's home pages. Crawls from the home pages of computer science departments in universities are likely to uncover resume pages. Therefore, our starting point set includes home pages of universities and colleges, which in turn could be obtained from online directories.
  Crawl Metric: For each page, we use the template to compute and see whether it is a resume page. If it is, we stop mining this page further because resume pages do not tend to point to each other. If it is not a resume page, we use a crawl metric to compute whether it is likely to bring us to resume pages. For this application, the crawl-metric is a simple correlation to the occurrence of keywords such as "teach", "department", "education", "computer science", "faculty", "student", "home page", "I am", "my", and "resume". These key words are likely to indicate whether a page corresponds to computer science department pages, faculty and student lists that may point to their home pages, or personal home pages that point to resume pages.
  Results: The crawl for CS PhDs found thousands of pages. The top 400 results were all resumes. Of the top 100 resumes, 89 matched the input requirements. In contrast, a query on the Google search engine resulted in results that were not uniformly good in quality. Out of the top 100 pages returned by Google, only 30 pages matched the input requirements. In addition, the average age of a page (duration for which it wasn't changed) returned by Google was 201 days as opposed to 45 days for our focused crawl results.

Finding Job Postings
  Goal: To build a focused crawler that discovers postings for job openings. This application clearly motivates the need for a focused crawler that finds fresh pages that correspond to recent job postings. Online search engines are likely to return stale pages containing job postings.
  Search metric: For this application, the search metric is a simple function that captures the occurrence of keywords such as "job", "employment", "career", "opportunity", "job title", and "degree preferred".
  Starting points: We observe that to find job postings you need to find potential employers first. Therefore, we include in our starting points set lists of employers that are available from online directories such as Yahoo. In particular, listings under folders such as "Business & Economy" are likely to provide data that potentially contains information and links to companies, which can then be included in the queue of starting points. In addition, we also include in the starting points set the results from querying search engine databases with key words "company", "university", and the words contained in the search metric described above. To get the crawl started, we do a breadth first crawl for each entry in the starting point queue to a depth of two. After this process is done for all the entries in the queue of starting points, we can go back to our normal ranking algorithms and sort the queue of all the pages brought by the initial phase of the crawl.
  Crawl metric: It is the same as the search metric for this application.
  Results: A focused crawl for job postings collected over a period of 80 hours found over 180,000 job postings. This number represents about one-fourth of the postings available from FlipDog, a specialized job-posting portal. Our crawler discovered job postings from 4000 employers who weren't represented at FlipDog. In addition, the postings from these 4000 employers had been either posted or modified in the month prior to the crawl, which would indicate that a search engine or a static job portal is unlikely to find these postings.

Populating a Folder in an Online Directory
  Goal: Given a folder, such as "Home→Computer&Internet→Internet→Peer-to-Peer File Sharing", that you might find in directories like Yahoo, populate the folder with pages that contain information relevant to the folder topic and related to the other pages that are already filed under this folder.

Starting points: We identify all the entries that currently exist inside this folder as the initial set of authoritative pages. Then we perform the general method of reverse crawling and distilling of hub-pages described at the beginning of this section to identify good starting points.

Search metric: A simple keyword based query containing the words appearing in the folder topic ("home", "computer", "internet", "peer-to-peer", and "file sharing") is not very effective in finding relevant pages from search engine databases. We have to use another set of key words that can describe the key features of pages that we would like to find. An automatic distiller that identifies common key words from the initial set of authoritative pages will be very useful in composing the search metric. We employed a semi-automatic process of automatic distillation followed by manual pruning of spurious matches to compose a search metric containing the following words: "file sharing", "content sharing", "file swap", "distribute", "community", "search", "napster", and "gnutella".

Crawl metric: It is the same as the search metric for this application.

Results: A focused crawl for pages related to "Peer-to-Peer File Sharing" found 233 pages during a five-hour crawl. The Yahoo folder for this topic contains 89 entries. Our crawl was able to find 74 of those pages. Only 17 of those additional pages found by our crawler are within a crawl distance of three from set of 89 pages filed within the Yahoo folder. These facts provide evidence regarding the effectiveness of our starting point analysis in increasing the coverage of a crawl.

Crawl for Wireless Startups

Goal: Given a particular market, the goal is to obtain comprehensive information on companies competing within the same market. We report on our experiences from setting up a crawl to find information about startup companies developing wireless products.

Starting points: We use the general method described earlier to find starting points. We can search databases of search engines using keywords such as "startup", "wireless", and "software". These results represent a variety of information about startup companies: their home pages, job listings from startup companies, venture capitals investing in startups, etc. From this initial set of pages, we obtain hub pages by performing reverse-crawls and iterative ranking steps. These hub pages tend to be we-sites of investors and technical news repositories. Therefore, in addition to the hub pages we get, we also include the investors' sites from the "corporate finance" folder of online directories and news archives such as CNET.

Search metric: We use the following list of keywords as the search metric: "startup", "wireless", "software", and "development".

Crawl metric: It is the same as the search metric for this application.

Results: Our crawler identifies quite a few pages as target matches even though they aren't related to information about wireless startup companies. However, this problem is easy to rectify by having a search metric that has a longer list of keywords to filter out low-quality pages. We would however persist with the same crawl metric as the crawl metric determines the coverage while the search metric determines the quality of target matches. We are experimenting with identifying a restrictive set of keywords for the search metric as well as using more advanced template-based similarity specifications.

Scalable Search Engines and Search/Crawl Engines Based on an Extensible Focused Crawler What has been described so far is a basic extensible focused crawler. We have largely focused on the case where the crawler starts from nothing, although as we have discussed it could start from a database of pages that was populated from previous crawls, either generic or focused. In these cases, the database could simply appear as the initial set of CRAWLED_PAGES. We now briefly discuss a few examples of building scalable crawl and search engines based on a focused crawler.

A simple example is to build a shared focused crawling infrastructure. A common database backs a number of crawler processes or threads, which are launched in response to incoming queries. Later crawls can thus benefit from pages brought in by earlier crawls (enabling some portions of the crawl or search to be done locally). Since crawls for similar or even different queries often crawl the same parts of the web, and since crawls for similar queries may be outstanding at the same time, crawls can be amortized across queries. If the analogy of a car was appropriate for the basic extensible focused crawler, the analogy of a bus shared among travelers can be used for this infrastructure. The bus provides users the ability to go to places that they wouldn't or couldn't on their own, the ability to share rides and amortize cost, and the ability to benefit from each other on route. In addition, there is a database of history, of data, and of crawling expertise (manifested in extensible crawl specifications), and a site for community. Many other value-added features are possible in this shared site environment. Result sets from focused crawls can also be recorded or cached explicitly, and the times at which they were performed recorded too, so that a later request for a similar query can be satisfied immediately with the results of a previous crawl if desired or accepted by the user. Alternatively, previously crawled pages are simply kept in an index, looked up upon a query and returned to the user together with the results of a crawl.

A more ambitious example is to use the focused crawler as the basis of a scalable search+crawl site. In it's simplest form, this is a straightforward extension of the previous example, though it would likely need to be much more scalable since it is designed for a much wider audience. Crawled pages (on various topics and keywords) are brought in to the crawler's shared database, via either focused or generic crawls, and these are indexed. Upon a query, results are first obtained from the database, using sophisticated indexing and ranking methods as in a state-of-the-art search engine. Together with these search results, the system returns to the user information about how fresh the data presented are, in terms of when the pages were last crawled and when the last crawl on that query/topic (or closely related queries/topics) were performed. If the user is not satisfied with the results, they can ask the system to do a focused crawl in real-time (perhaps returning the results via e-mail, which provides an opportunity for the site to use permission-based marketing/advertising to the user based on topics crawled, or via the web). The user can specify how long the crawl should continue, and other parameters governing the progress of the crawl. The crawl may begin within the search database itself. The computational and bandwidth resources to perform the crawl can be the system's or search+crawl site's resources, which may be centralized or distributed. However, the challenge in handling many crawl requests from a wide range of users is scaling, and is a magnified version of the scaling problem for search engine infrastructures.

An insight that leads to a truly distributed solution is that the only thing that scales with the number of crawl requests made is the number of users, and these users very often have their own, increasingly powerful resources. Thus, the resources of users (most importantly, bandwidth and some computational power) can be used to help perform the crawls. For example, the site can provide the user with a piece of focused crawler code, which the user can execute to perform the crawl, perhaps in coordination with the site's database and crawl-guiding infrastructure. If the resulting pages are stored by the user rather than by the site, the software can send the crawled URLs or pages back to the site during or at the end of the crawl. This coordinated helper-based crawling and bandwidth/cycles stealing may happen for the particular crawl that the user requested. Alternatively, a user may provide cycles and bandwidth at given times of the day, in return for privileges from the site, and the site may utilize those resources for any crawls it desires. Bandwidth on people's computers is often idle, and is therefore an attractive resource to utilize in this way given the bandwidth-intensive nature of crawling. Of course, if the user's cycles or bandwidth are not used or are not worth using, other options are available. The resources used for crawling may belong to the user's internet service provider, e.g. to gain the right for its users to participate in this search+crawl site or for money, or by dedicated third parties.

Another method for building a scalable distributed search engine on top of focused crawl is to use a 'community'-based approach like the one used by Gnutella (www.gnutella.com). Topic-specific portals (or even generic portals, which tend to have topic-specific sections), can use the focused and extensible crawler to find the best data on their topics of interest. This is their strength, as discussed earlier in the applications of the basic extensible focused crawler. They can index these data and build topic- or site-specific search engines (where a site here may be a small topical site or 'portal' on recipes or a large portal like Yahoo or AOL). In addition, however, if these portals or servers are linked together, a query coming in to this network can be applied to any or all of the servers/portals. It may be desirable to organize the overall system as a topic hierarchy and propagate queries down that hierarchy, so that not every server or portal has to be bothered by every (irrelevant) query and so that results are obtained faster. Individual sites and portals (especially small- to medium-sized portals) have the incentive to join this community and enable access to their crawled information by searches done on community sites, since they get to participate in and provided access to their users in a whole that is much greater than the parts. For example, a portal focused on stamp-collecting may provide access to its crawled pages to the distributed search system, and in return its users get access to the best search engine in the world for all kinds of information coming from other such portals, not just for stamps. Individual members of the community (whether businesses or individuals) are able to focus on their core expertise, and the infrastructure, crawling methods and methods to obtain leverage from the use of good extensible focused crawl infrastructure by other participants are taken care of by the proposed system.

Note:

When a claim or a claim limitation or part of a claim limitation "comprises A and B" or "includes A and B", the claim or the claim limitation or the part of a claim limitation is open ended, allowing further inclusion of, for example, C, or C and D, etc.

Some embodiments of focused crawling comprise:

accessing a query input, the query input being relevant to at least one of target documents and referring documents, each of the referring documents refer to at least one of the target documents;

crawling a plurality of documents, the documents including links to each other, and the crawling at least partly guided by a crawl metric, the crawl metric at least partly determined by a first mechanism; and returning target documents, the target documents being relevant to the query input, the target documents found from the plurality of crawled documents, the target documents returned at least partly based on a search metric, the search metric at least partly determined by a second mechanism, the second mechanism being different from the first mechanism.

In various embodiments, relevance includes importance.

In various embodiments, at least one of the first mechanism and the second mechanism includes:

associating a weight to each of the evaluated relevances of the procedures; and combining the evaluated relevances and the weights of the evaluated relevances.

In various embodiments, evaluating relevance of documents includes evaluating relevance of at least a first document and a second document, the second document referring to the first document.

Some embodiments of focused crawling comprise:

accessing a query input; and crawling a plurality of documents, the documents including links to each other, the crawling at least partly guided by a crawl metric, the crawl metric at least partly determined by a mechanism and by the query input, the mechanism including a combination, the combination including evaluating relevance of documents using a freshness of documents, and one or more of: 1) evaluating relevance of documents using logical expressions of keywords and phrases and 2) evaluating relevance of documents using a template including a plurality of one or more template portions, at least one of the template portions including a plurality of one or more hierarchical levels.

In various embodiments, the combination includes evaluating relevance of documents using a freshness of documents, and one or more of: 1) evaluating relevance of documents using logical expressions of keywords and phrases 2) evaluating relevance of documents using a template including a plurality of one or more template portions, at least one of the template portions including a plurality of one or more hierarchical levels, and 3) evaluating relevance of documents using a link structure of the crawled documents.

In various embodiments, relevance includes importance.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments further comprise:

returning target documents, the target documents being relevant to the query input, the target documents found from the plurality of crawled documents, the target documents returned at least partly based on a search metric, the search metric at least partly determined by a second mechanism and the query input.

Some embodiments of focused crawling comprise:

accessing a query input; and crawling a plurality of documents, the documents including links to each other, the crawling at least partly guided by a crawl metric, the crawl metric at least partly determined by a mechanism and by the query input, the mechanism including a combination, the combination including evaluating relevance of documents using a link structure of the crawled documents, and one or more of: 1) evaluating relevance of documents using logical expressions of keywords and phrases and 2) evaluating relevance of documents using a template including a plurality of one or more template portions, at least one of the template portions including a plurality of one or more hierarchical levels.

In various embodiments, the combination including evaluating relevance of documents using a link structure of the crawled documents, and evaluating relevance based on freshness of documents, and one or more of: 1) evaluating relevance of documents using logical expressions of keywords and phrases, 2) evaluating relevance of documents using content located in a specified part of a format.

In various embodiments, relevance includes importance.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, further comprise:

returning target documents, the target documents being relevant to the query input, the target documents found from the plurality of crawled documents, the target documents returned at least partly based on a search metric, the search metric at least partly determined by a second mechanism and the query input.

Some embodiments of focused crawling comprise:

accessing a query input; and crawling a plurality of documents, the documents including links to each other, the crawling at least partly guided by a crawl metric, the crawl metric at least partly determined by a mechanism and by the query input, the mechanism including a combination, the combination including evaluating relevance of documents using a link structure of the crawled documents, and one or more of: 1) evaluating relevance of documents using logical expressions of keywords and phrases and 2) evaluating relevance of documents using a template including a plurality of one or more template portions, at least one of the template portions including a plurality of one or more hierarchical levels, wherein evaluating relevance of documents using a link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, the combination including evaluating relevance of documents using a link structure of the crawled documents, and evaluating relevance based on freshness of documents, and one or more of: 1) evaluating relevance of documents using logical expressions of keywords and phrases, 2) evaluating relevance of documents using content located in a specified part of a format.

In various embodiments, relevance includes importance.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, evaluating relevance of documents using a link structure of the crawled documents further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, evaluating relevance of documents using a link structure of the crawled documents further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, evaluating relevance of documents using a link structure of the crawled documents further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, evaluating relevance of documents using a link structure of the crawled documents further comprise:

shrinking the graph by removing one or more nodes of the graph.

In various embodiments, evaluating relevance of documents using a link structure of the crawled documents further comprise:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, relevance includes importance.

In various embodiments, further comprise:

returning target documents, the target documents being relevant to the query input, the target documents found from the plurality of crawled documents, the target documents returned at least partly based on a search metric, the search metric at least partly determined by a second mechanism and the query input.

Some embodiments of focused crawling comprise:
accessing a query input;
crawling a plurality of documents, the documents including links to each other, and the crawling at least partly guided by a crawl metric, the crawl metric at least partly determined by a first mechanism, the first mechanism including a first combination, the first combination including a first plurality of one or more procedures, the first plurality of one or more procedures including evaluating relevance of documents using a link structure of the crawled documents; and
returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including evaluating relevance of documents using a template, the template including a plurality of one or more template portions, at least one of the template portions including a plurality of one or more hierarchical levels, wherein the procedure, of the first plurality of one or more procedures, of evaluating relevance of documents using a link structure of the crawled documents, includes:
accessing a first plurality of documents from a database of a plurality of received documents, the plurality of received documents including crawled documents, the first plurality of documents to be ranked;
generating a graph of the first plurality of documents;
assigning weights to one or more nodes of the graph;
finding an assignment of weights to one or more nodes of the graph, by propagating weights through the graph, the assignment of weight to a node based at least in part on calculating a weighted sum of weights propagated from neighboring nodes; and
generating a ranked list of at least the first plurality of documents, the ranked list at least partly generated from the graph.

In various embodiments, relevance includes importance.

In various embodiments, at least one of the first mechanism and the second mechanism includes:
associating a weight to each of the evaluated relevances of the procedures; and
combining the evaluated relevances and the weights of the evaluated relevances.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:
expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:
expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure of the first plurality of one or more procedures, of evaluating relevance of documents using a link structure of the crawled documents, further comprises:
expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:
 shrinking the graph by removing one or more nodes of the graph.

In various embodiments, the procedure, of the first plurality of one or more procedures, of evaluating relevance of documents using a link structure of the crawled documents, further comprises:
 shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, 2) evaluating relevance of documents using a link structure of the crawled documents, and 3) evaluating relevance based on freshness of documents.

In various embodiments, the first plurality of one or more procedures further includes one or more of: 1) evaluating relevance of documents using logical expressions of keywords and phrases, 2) evaluating relevance of documents using a template including a plurality of one or more template portions, at least one of the template portions including a plurality of one or more hierarchical levels, and 3) evaluating relevance based on freshness of documents.

Some embodiments of focused crawling comprise:
 accessing a query input;
 crawling a plurality of documents, the documents including links to each other, and the crawling at least partly guided by a crawl metric, the crawl metric at least partly determined by a first mechanism, the first mechanism including a first combination, the first combination including a first plurality of one or more procedures, the first plurality of one or more procedures including 1) evaluating relevance of documents using a link structure of the crawled documents and 2) evaluating relevance based on freshness of documents; and
 returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including evaluating relevance of documents using a template, the template including a plurality of one or more template portions, at least one of the template portions including a plurality of one or more hierarchical levels, wherein the procedure, of the first plurality of one or more procedures, of evaluating relevance of documents using a link structure of the crawled documents, includes:
 accessing a first plurality of documents from a database of a plurality of received documents, the plurality of received documents including crawled documents, the first plurality of documents to be ranked;
 generating a graph of the first plurality of documents;
 assigning weights to one or more nodes of the graph;
 finding an assignment of weights to one or more nodes of the graph, by propagating weights through the graph, the assignment of weight to a node based at least in part on calculating a weighted sum of weights propagated from neighboring nodes; and
 generating a ranked list of at least the first plurality of documents, the ranked list at least partly generated from the graph.

In various embodiments, relevance includes importance.

In various embodiments, at least one of the first mechanism and the second mechanism includes:
 associating a weight to each of the evaluated relevances of the procedures; and
 combining the evaluated relevances and the weights of the evaluated relevances.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:
 expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:
 expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, 2) evaluating relevance of documents using a link structure of the crawled documents, and 3) evaluating relevance based on freshness of documents.

In various embodiments, the first plurality of one or more procedures further includes one or more of: 1) evaluating relevance of documents using logical expressions of keywords and phrases, 2) evaluating relevance of documents using a template including a plurality of one or more template portions, at least one of the template portions including a plurality of one or more hierarchical levels.

Some embodiments of focused crawling comprise:
accessing a query input;
crawling a plurality of documents, the documents including links to each other, and the crawling at least partly guided by a crawl metric, the crawl metric at least partly determined by a first mechanism, the first mechanism including a first combination, the first combination including a first plurality of one or more procedures, the first plurality of one or more procedures including one or more of: 1) evaluating relevance of documents using logical expressions of keywords and phrases, 2) evaluating relevance of documents using a template including a plurality of one or more template portions, at least one of the template portions including a first plurality of one or more hierarchical levels, 3) evaluating relevance of documents using a first link structure of the crawled documents, and 4) evaluating relevance based on freshness of documents; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including 1) evaluating relevance of documents using a template, the template including a plurality of one or more template portions, at least one of the template portions including a second plurality of one or more hierarchical levels, and 2) evaluating relevance of documents using a second link structure of the crawled documents, wherein one or more of 1) evaluating relevance of documents using a first link structure of the crawled documents, and 2) evaluating relevance of documents using a second link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, relevance includes importance.

In various embodiments, at least one of the first mechanism and the second mechanism includes:
associating a weight to each of the evaluated relevances of the procedures; and
combining the evaluated relevances and the weights of the evaluated relevances.

In various embodiments, one or more of: 1) the first plurality of one or more hierarchical levels and 2) the second plurality of one or more hierarchical levels, includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprising:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, and 2) evaluating relevance based on freshness of documents.

Some embodiments of focused crawling comprise:

accessing a query input;

crawling a plurality of documents, the documents including links to each other, and the crawling at least partly guided by a crawl metric, the crawl metric at least partly determined by a first mechanism, the first mechanism including a first combination, the first combination including a first plurality of one or more procedures, the first plurality of one or more procedures including evaluating relevance of documents using a first link structure of the crawled documents; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including 1) evaluating relevance of documents using a template, the template including a plurality of one more template portions, at least one of the template portions including a plurality of one or more hierarchical levels, and 2) evaluating relevance of documents using a second link structure of the crawled documents, wherein one or more of 1) evaluating relevance of documents using a first link structure of the crawled documents, and 2) evaluating relevance of documents using a second link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, relevance includes importance.

In various embodiments, at least one of the first mechanism and the second mechanism includes:

associating a weight to each of the evaluated relevances of the procedures; and combining the evaluated relevances and the weights of the evaluated relevances.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, and 2) evaluating relevance based on freshness of documents.

In various embodiments, the first plurality of one or more procedures further includes one or more of: 1) evaluating relevance of documents using logical expressions of keywords and phrases, 2) evaluating relevance of documents using a template including a plurality of one or more template portions, at least one of the template portions including a plurality of one or more hierarchical levels, and 3) evaluating relevance based on freshness of documents.

Some embodiments of focused crawling comprise:

accessing a query input;

crawling a plurality of documents, the documents including links to each other, and the crawling at least partly guided by a crawl metric, the crawl metric at least partly determined by a first mechanism, the first mechanism including a first combination, the first combination including a first plurality of one or more procedures, the first plurality of one or more procedures including 1) evaluating relevance of documents using a first link structure of the crawled documents, and 2) evaluating relevance based on freshness of documents; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including 1) evaluating relevance of documents using a template, the template including a plurality of one or more template portions, at least one of the template portions including a second plurality of one or more hierarchical levels, and 2) evaluating relevance of documents using a second link structure of the crawled documents, wherein one or more of 1) evaluating relevance of documents using a first link structure of the crawled documents, and 2) evaluating relevance of documents using a second link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, relevance includes importance.

In various embodiments, at least one of the first mechanism and the second mechanism includes:

associating a weight to each of the evaluated relevances of the procedures; and combining the evaluated relevances and the weights of the evaluated relevances.

In various embodiments, the plurality of one or more hierarchical levels includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, and 2) evaluating relevance based on freshness of documents.

In various embodiments, the first plurality of one or more procedures further includes one or more of: 1) evaluating relevance of documents using logical expressions of keywords and phrases, 2) evaluating relevance of documents using a template including a plurality of one or more template portions, at least one of the template portions including a plurality of one or more hierarchical levels.

Some embodiments of focused crawling comprise:

accessing a query input; and crawling a plurality of documents, the documents including links to each other, the crawling at least partly guided by a crawl metric, the crawl metric at least partly determined by a first mechanism, the first mechanism including a first combination, the first combination including a first plurality of one or more procedures, the first plurality of one or more procedures including evaluating relevance of documents using a link structure of the crawled documents, and one or more of: 1) evaluating relevance of documents using logical expressions of keywords and phrases and 2) evaluating relevance of documents using a template including a plurality of one or more template portions, at least one of the template portions including a plurality of one or more hierarchical levels; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including 1) evaluating relevance of documents using a template, the template including a plurality of one or more template portions, at least one of the template portions including a second plurality of one or more hierarchical levels, and 2) evaluating relevance of documents using a second link structure of the crawled documents, wherein one or more of 1) evaluating relevance of documents using a first link structure of the crawled documents, and 2) evaluating relevance of documents using a second link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, relevance includes importance.

In various embodiments, at least one of the first mechanism and the second mechanism includes:

associating a weight to each of the evaluated relevances of the procedures; and combining the evaluated relevances and the weights of the evaluated relevances.

In various embodiments, one or more of: 1) the first plurality of one or more hierarchical levels and 2) the second plurality of one or more hierarchical levels, includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprising:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, and 2) evaluating relevance based on freshness of documents.

In various embodiments, the first plurality of one or more procedures further includes evaluating relevance based on freshness of documents.

Some embodiments of focused crawling comprise:

accessing a query input; and crawling a plurality of documents, the documents including links to each other, the crawling at least partly guided by a crawl metric, the crawl metric at least partly determined by a first mechanism, the first mechanism including a first combination, the first combination including a first plurality of one or more procedures, the first plurality of one or more procedures including evaluating relevance of documents using a link structure of the crawled documents and evaluating relevance of documents using logical expressions of keywords and phrases; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including a second plurality of one or more procedures, the second plurality of procedures including 1) evaluating relevance of documents using a template, the template including a plurality of one or more template portions, at least one of the template portions including a second plurality of one or more hierarchical levels, and 2) evaluating relevance of documents using a second link structure of the crawled documents, wherein one or more of 1) evaluating relevance of documents using a first link structure of the crawled documents, and 2) evaluating relevance of documents using a second link structure of the crawled documents includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, relevance includes importance.

In various embodiments, at least one of the first mechanism and the second mechanism includes:

associating a weight to each of the evaluated relevances of the procedures; and combining the evaluated relevances and the weights of the evaluated relevances.

In various embodiments, one or more of: 1) the first plurality of one or more hierarchical levels and 2) the second plurality of one or more hierarchical levels, includes at least one or more heading levels and one or more content levels.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the procedure, of the first plurality of one or more procedures, of evaluating relevance of documents using a link structure of the crawled documents, further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, the procedure, of the first plurality of one or more procedures, of evaluating relevance of documents using a link structure of the crawled documents, further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, the procedure, of the first plurality of one or more procedures, of evaluating relevance of documents using a link structure of the crawled documents, further comprises:

shrinking the graph by removing one or more nodes of the graph.

In various embodiments, the procedure, of the first plurality of one or more procedures, of evaluating relevance of documents using a link structure of the crawled documents, further comprising:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the second plurality of procedures further includes one or more of: 1) evaluating relevance of documents using logical expressions of keywords and phrases, and 2) evaluating relevance based on freshness of documents.

In various embodiments, the first plurality of one or more procedures further includes one or more of: 1) evaluating relevance of documents using a template including a plurality of one or more template portions, at least one of the template portions including a plurality of one or more hierarchical levels, and 2) evaluating relevance based on freshness of documents.

Some embodiments of ranking documents comprise:

accessing a plurality of documents, the documents including links to each other;

generating a graph representation of the plurality of documents, such that nodes of the graph represent the documents, and edges of the graph represent links linking the documents;

assigning weights to one or more nodes of the graph;

finding an approximate assignment of weights to one or more nodes of the graph, by propagating weights through the graph, the approximate assignment of weight to a node based at least in part on calculating a weighted sum of weights propagated from neighboring nodes; and generating a ranked list of the plurality of documents, the ranked list at least partly generated from the graph.

In various embodiments, relevance includes importance.

Some embodiments of ranking documents comprise:

accessing a first plurality of documents from a database of a plurality of received documents, the first plurality of documents to be ranked;

generating a graph of the first plurality of documents;

expanding the graph with a second plurality of one or more documents from the database, wherein a third plurality includes a union of the first plurality of documents and the second plurality of documents, and the third plurality of documents is smaller than the plurality of received documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

Some embodiments of ranking documents comprise:

accessing a first plurality of documents from a database of a plurality of received documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

Some embodiments of ranking documents comprise:

accessing a first plurality of documents from a database of a plurality of received documents, the first plurality of documents to be ranked;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, wherein a third plurality includes a union of the first plurality of documents and the second plurality of documents, and the third plurality of documents is smaller than the plurality of received documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a node include at least one of relevance of the document to a query input and importance of the document independent of the query input.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked;

generating a graph of the first plurality of documents;

expanding the graph with a second plurality of one or more documents from the database, wherein a third plurality includes a union of the first plurality of documents and the second plurality of documents, and the third plurality of documents is smaller than the plurality of received documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

Some embodiments of ranking documents comprise:

accessing a first plurality of documents from a database of a plurality of received documents, the first plurality of documents to be ranked;

generating a graph of the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

Some embodiments of ranking documents comprise:

accessing a first plurality of documents from a database of a plurality of received documents, the first plurality of documents to be ranked;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

Some embodiments of ranking documents comprise:

accessing a first plurality of documents from a database of a plurality of received documents, the first plurality of documents to be ranked;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, wherein a third plurality includes a union of the first plurality of documents and the second plurality of documents, and the third plurality of documents is smaller than the plurality of received documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

In various embodiments, the first plurality of documents includes documents of the plurality of received documents that are most recently received.

Some embodiments of ranking documents comprise:

accessing a first plurality of documents from a database of a plurality of received documents, the first plurality of documents to be ranked, the first plurality of documents including recently received documents of the plurality of received documents;

generating a graph of the first plurality of documents;

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents;

shrinking the graph by removing one or more nodes of the graph and by combining one or more sets of one or more nodes of the graph;

assigning weights to one or more nodes of the graph, wherein weights assigned to a node include at least one of relevance of the document to a query input and importance of the document independent of the query input;

finding an assignment of weights to one or more nodes of the graph, by propagating weights through the graph up to a limited node distance, the assignment of weight to a node based at least in part on calculating a weighted sum of weights propagated from neighboring nodes; and generating a ranked list of at least the first plurality of documents, the ranked list at least partly generated from the graph.

In various embodiments, the combining is based on common characteristics of the nodes or relationships between the nodes.

In various embodiments, the first plurality of documents includes documents of the plurality of received documents that are most recently received.

Some embodiments of ranking documents comprise:

accessing a plurality of documents, the documents including links to each other;

generating a graph representation of the plurality of documents, such that nodes of the graph represent the documents, and edges of the graph represent links linking the documents;

shrinking the graph by removing one or more nodes of the graph;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of the plurality of documents, the ranked list at least partly generated from the graph.

Some embodiments of ranking documents comprise:

accessing a plurality of documents, the documents including links to each other;

generating a graph representation of the plurality of documents, such that nodes of the graph represent the documents, and edges of the graph represent links linking the documents;

shrinking the graph by combining one or more sets of one or more nodes of the graph;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of the plurality of documents, the ranked list at least partly generated from the graph.

Some embodiments of ranking documents comprise:

accessing a plurality of documents, the documents including links to each other;

generating a graph representation of the plurality of documents, such that nodes of the graph represent the documents, and edges of the graph represent links linking the documents;

assigning weights to one or more nodes of the graph;

propagating weights through the graph occurs up to a limited node distance;

finding an assignment of weights to one or more nodes of the graph, by propagating weights through the graph, the assignment of weight to a node based at least in part on calculating a weighted sum of weights propagated from neighboring nodes; and generating a ranked list of the plurality of documents, the ranked list at least partly generated from the graph.

Some embodiments of focused crawling comprise:

accessing input including one or more queries; and crawling a plurality of documents, the documents including links to each other, the crawling at least partly guided by a crawl metric, the crawl metric at least partly determined by at least one of a mechanism and at least part of the input, the mechanism at least evaluating relevance of documents using an approximate link structure of the crawled documents.

In various embodiments, the link structure of the crawled documents is approximated by:

generating a graph representation of the plurality of documents, such that nodes of the graph represent the documents, and edges of the graph represent links linking the documents;

assigning weights to one or more nodes of the graph;

finding an approximate assignment of weights to nodes of the graph, by propagating weights through the graph and calculating a weighted sum of weights propagated from neighboring nodes; and generating a ranked list of the plurality of documents, the ranked list at least partly generated from the graph.

In various embodiments, the mechanism also includes one or more of: 1) evaluating relevance of documents using logical expressions of keywords and phrases and 2) evaluating relevance of documents using a template including a plurality of one or more template portions, at least one of the template portions including a plurality of one or more hierarchical levels.

In various embodiments, relevance includes importance.

In various embodiments, evaluating relevance of documents includes evaluating relevance of at least a first document and a second document, the second document referring to the first document.

Some embodiments of focused crawling comprise:

accessing query input; and crawling a plurality of documents, the documents including links to each other, the crawling at least partly guided by a crawl metric, the crawl metric at least partly determined by at least one of a mechanism and at least part of the query input, the mechanism at least evaluating relevance of documents using a link structure of the crawled documents, wherein using the link structure includes:

accessing a first plurality of documents from a database of a plurality of received documents, the plurality of received documents including crawled documents, the first plurality of documents to be ranked;

generating a graph of the first plurality of documents;

assigning weights to one or more nodes of the graph;

finding an assignment of weights to one or more nodes of the graph, by propagating weights through the graph, the assignment of weight to a node based at least in part on calculating a weighted sum of weights propagated from neighboring nodes; and generating a ranked list of at least the first plurality of documents, the ranked list at least partly generated from the graph.

In various embodiments, using the link structure further comprises:

expanding the graph with a second plurality of one or more documents from the database, wherein a third plurality includes a union of the first plurality of documents and the second plurality of documents, and the third plurality of documents is smaller than the plurality of received documents.

In various embodiments, using the link structure further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

In various embodiments, using the link structure further comprises:

expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

In various embodiments, the first plurality of documents includes recently received documents of the plurality of received documents.

In various embodiments, further comprises:

shrinking the graph by removing one or more nodes of the graph.

In various embodiments, further comprises:

shrinking the graph by combining one or more sets of one or more nodes of the graph.

In various embodiments, the combining is based on common characteristics of the nodes or relationships between the nodes.

In various embodiments, the propagating weights through the graph occurs up to a limited node distance.

In various embodiments, weights assigned to a document include at least one of relevance of the document to the query input and importance of the document independent of the query input.

In various embodiments, the mechanism also includes one or more of: 1) evaluating relevance of documents using logical expressions of keywords and phrases and 2) evaluating relevance of documents using a template including a plurality of one or more template portions, at least one of the template portions including a plurality of one or more hierarchical levels.

In various embodiments, relevance includes importance.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, further comprises:

returning target documents, the target documents being relevant to the query input, the target documents found from the plurality of crawled documents, the target documents returned at least partly based on a search metric, the search metric at least partly determined by a second mechanism and the query input.

Some embodiments of finding documents comprise:

accessing a plurality of one or more documents;

accessing a search template, the search template includes a plurality of one or more template portions, at least one of the template portions including a plurality of one or more hierarchical levels; and returning target documents, the target documents found from the plurality of documents, the target documents returned at least partly based on a search metric, the search metric at least partly determined by a mechanism, the mechanism includes at least evaluating relevance of documents to the search template.

In various embodiments, the accessed search template is determined from the plurality of sample documents.

In various embodiments, at least one of the heading level and the content level of at least one of the template potions is specified by at least a logical expression of keywords and phrases.

In various embodiments, at least one of the returned target documents has relevance to one or more template portions of the search template.

In various embodiments, the returned target documents are ranked at least partly based on relevance to a number of template portions of the search template.

In various embodiments, the accessed search template is retrieved from a repository of search templates.

In various embodiments, the accessed search template is constructed from the plurality of one or more documents.

In various embodiments, relevance includes importance.

In various embodiments, the plurality of one or more hierarchical levels includes at least one or more heading levels and one or more content levels.

In various embodiments, evaluating relevance of documents includes evaluating relevance of at least a first document and a second document, the second document referring to the first document.

Some embodiments of focused crawling comprise:

accessing at least a search template, the search template including a plurality of one or more template portions, at least one of the template portions including a plurality of one or more hierarchical levels;

crawling a plurality of one or more documents, at least some of the plurality of one or more documents including links to at least one other document of the plurality of one or more documents; and returning target documents, the target documents found from the plurality of documents, the target documents returned at least partly based on a search metric, the search metric at least partly determined by a mechanism, the mechanism includes at least evaluating relevance of documents to the search template.

In various embodiments, the accessed search template is determined from the plurality of sample documents.

In various embodiments, at least one of the heading level and the content level of at least one of the template potions is specified by at least a logical expression of keywords and phrases.

In various embodiments, at least one of the returned target documents has relevance to one or more template portions of the search template.

In various embodiments, the returned target documents are ranked at least partly based on relevance to a number of template portions of the search template.

In various embodiments, the accessed search template is retrieved from a repository of search templates.

In various embodiments, the accessed search template is constructed from the plurality of one or more documents.

In various embodiments, relevance includes importance.

In various embodiments, the plurality of one or more hierarchical levels includes at least one or more heading levels and one or more content levels.

In various embodiments, evaluating relevance of documents includes evaluating relevance of at least a first document and a second document, the second document referring to the first document.

Some embodiments of focused crawling comprise:

accessing a query input including at least a template, the template including a plurality of one or more template portions, at least one of the template portions including a plurality of one or more hierarchical levels; and crawling a plurality of documents, the documents including links to each other, the crawling at least partly guided by a crawl metric, the crawl metric at least partly determined by a mechanism and by the query input, the mechanism including at least evaluating relevance of documents to the template.

In various embodiments, the accessed search template is determined from the crawled plurality of documents.

In various embodiments, at least one of the heading level and the content level of at least one of the template potions is specified by at least a logical expression of keywords and phrases.

In various embodiments, relevance includes importance.

In various embodiments, the plurality of one or more hierarchical levels includes at least one or more heading levels and one or more content levels.

In various embodiments, evaluating relevance of documents includes evaluating relevance of at least a first document and a second document, the second document referring to the first document.

Some embodiments of building a repository comprise:

accessing a query input;

crawling a plurality of documents, the documents including links to each other;

returning at least one of a plurality of one or more target documents and a plurality of one or more referring documents, the target documents returned being at last partly relevant to the query input, the target documents found from the plurality of crawled documents; and storing one or more of: the plurality of one or more target documents and the plurality of one or more referring documents.

In various embodiments, at least one of the plurality of referring documents refers to at least one of the plurality of target documents directly.

In various embodiments, at least one of the plurality of referring documents refers to at least one of the plurality of target documents indirectly through one or more documents.

In various embodiments, further comprises:

accessing second query input;

searching the stored documents, at least partly responsive to the second query input; and returning at least one of a second plurality of one or more target documents, the target documents returned being at last partly relevant to the second query input.

In various embodiments, further comprises:

receiving a plurality of one or more fresh documents; and updating one or more of the stored documents with plurality of one or more fresh documents.

In various embodiments, the plurality of one or more fresh documents is received if one or more of the stored documents has changed.

In various embodiments, further comprises:

crawling a second plurality of documents from at least one of the stored documents.

In various embodiments, relevance includes importance.

Some embodiments of a system comprise:

a first processor; and a first plurality of one or more processors, wherein the first processor and each of the first plurality of one or more processors at least partly performs:

accessing a first query input and a second query input;

crawling a plurality of documents, at least some of the plurality of documents including links to each other, the crawling at least partly guided by a crawl metric, the crawl metric at least partly determined by a mechanism and by the first query input; and returning target documents, the target documents being relevant to the query input, the target documents found from the plurality of crawled documents, the target documents returned at least partly based on a search metric, the search metric at least partly determined by the mechanism and by the second query input.

In various embodiments, relevance includes importance.

Some embodiments of a method comprise:

accessing a query input;

crawling a plurality of documents, the documents including links to each other, and the crawling at least partly guided by a crawl metric, the crawl metric at least partly determined by a first mechanism, the first mechanism including a first combination, the first combination including one or more of: 1) evaluating relevance of documents using logical expressions of keywords and phrases, 2) evaluating relevance of documents using a template including a plurality of one or more template portions, at least one of the template portions including a first plurality of one or more hierarchical levels, 3) evaluating relevance of documents using a link structure of the crawled documents, and 4) evaluating relevance based on freshness of documents; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including one or more of: 1) evaluating relevance of documents using logical expressions of keywords and phrases, 2) evaluating relevance of documents using a template including a plurality of one or more template portions, at least one of the template portions including a second plurality of one or more hierarchical levels, 3) evaluating relevance of documents using a link structure of the crawled documents, and 4) evaluating relevance based on freshness of documents, wherein the method is performed on at least one of 1)a first processor and 2) one or more of a first plurality of one or more processors.

In various embodiments, at least a first task of a plurality of tasks is performed on at least the first processor, and at least a second task of the plurality of tasks is performed on at least one processor of the first plurality of one or more processors, and the plurality of tasks includes:

1) computing starting points from sample documents;
2) computing the link structure of the crawled documents;
3) evaluating relevance of documents using logical expressions of keywords and phrases;
4) evaluating relevance of documents using the template; and
5) fetching the crawled documents.

In various embodiments, fetching the crawled documents includes fetching at least one document from at least one remote server.

In various embodiments, relevance includes importance.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

In various embodiments, the first plurality of one or more hierarchical levels includes at least one or more heading levels and one or more content levels.

In various embodiments, the second plurality of one or more hierarchical levels includes at least one or more heading levels and one or more content levels.

In various embodiments, evaluating relevance of documents includes evaluating relevance of at least a first document and a second document, the second document referring to the first document.

In various embodiments, at least one task of a plurality of tasks is performed on at least two processors, and the plurality of tasks includes:

1) computing starting points from sample documents;
2) computing the link structure of the crawled documents;
3) evaluating relevance of documents using logical expressions of keywords and phrases;
4) evaluating relevance of documents using the template; and
5) fetching the crawled documents.

In various embodiments, fetching the crawled documents includes fetching at least one document from at least one remote server.

Some embodiments of a method comprise:
accessing a query input;
crawling a plurality of documents, the documents including links to each other, and the crawling at least partly guided by a crawl metric, the crawl metric at least partly determined by a first mechanism, the first mechanism including a first combination, the first combination including one or more of: 1) evaluating relevance of documents using logical expressions of keywords and phrases, 2) evaluating relevance of documents using a template including a plurality of one or more template portions, at least one of the template portions including a first plurality of one or more hierarchical levels, 3) evaluating relevance of documents using a link structure of the crawled documents, and 4) evaluating relevance based on freshness of documents; and returning target documents, the target documents being relevant to the query input, the target documents found from the plurality of crawled documents, the target documents returned at least partly based on a search metric, the search metric at least partly determined by a second mechanism, the second mechanism including a second combination, the second combination being different from the first combination, the second combination including one or more of: 1) evaluating relevance of documents using logical expressions of keywords and phrases, 2) evaluating relevance of documents using a template including a plurality of one or more template portions, at least one of the template portions including a second plurality of one or more hierarchical levels, 3) evaluating relevance of documents using a link structure of the crawled documents, and 4) evaluating relevance based on freshness of documents, wherein, during at least part of a time interval, the time interval beginning at a first time and ending at a second time, the first time being a sending of an access request for a document from a remote server, the second time being a receiving of the document from the remote server, the method performs at least one of a plurality of tasks, the plurality of tasks including:

1) computing the link structure of the crawled documents;
2) evaluating relevance of documents using logical expressions of keywords and phrases;
3) evaluating relevance of documents using the template;
4) requesting a second document; and
5) receiving a third document.

In various embodiments, relevance includes importance.

In various embodiments, the first plurality of one or more hierarchical levels includes at least one or more heading levels and one or more content levels.

In various embodiments, the second plurality of one or more hierarchical levels includes at least one or more heading levels and one or more content levels.

In various embodiments, evaluating relevance of documents includes evaluating relevance of at least a first document and a second document, the second document referring to the first document.

In various embodiments, evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

The invention claimed is:

1. A method of focused crawling, comprising:
accessing a query input;
crawling a plurality of documents continually, the documents including links to each other, and the crawling at least partly guided by a crawl metric, wherein the crawl metric quantifies priority for crawling links emanating from a certain document within the crawling, the crawl metric at least partly determined by a first mechanism, the first mechanism including a first combination, the first combination including a first plurality of one or more procedures, the first plurality of one or more procedures including evaluating relevance of documents using a link structure of the crawled documents, wherein the evaluating relevance of documents using a link structure of the crawled documents is performed repeatedly and continually, and wherein the evaluating relevance of documents using a link structure of the crawled documents includes:

accessing a first plurality of documents from a database of a plurality of received documents, the plurality of received documents including crawled documents, the first plurality of documents to be ranked, generating a graph of the first plurality of documents, assigning weights to a plurality of nodes of the graph, wherein nodes of the graph represent the documents and edges represent links between the documents, finding an assignment of weights to one or more nodes of the graph, by propagating weights through the graph, the assignment of weight to a node based at least in part on calculating a weighted sum of weights propagated from neighboring nodes, and generating a ranked list of at least the first plurality of documents, the ranked list at least partly generated from the graph; and returning target documents, the target documents being relevant to the query input, the target documents found from the plurality of crawled documents, the target documents returned at least partly based on a search metric, the search metric quantifying relevance or importance of a document to the query input, the search metric at least partly determined by a second mechanism, the second mechanism including a second combination, the second combination being different from the first combination, the second combination including a second plurality of one or more procedures, the second plurality of procedures including evaluating relevance of documents using a template, the template including a plurality of one or more template portions, at least one of the template portions including a second plurality of one or more hierarchical levels.

2. The method of claim 1, wherein relevance includes importance.

3. The method of claim 1, wherein at least one of the first mechanism and the second mechanism includes:
   associating a weight to each of the evaluated relevances of the procedures; and
   combining the evaluated relevances and the weights of the evaluated relevances.

4. The method of claim 1, wherein one or more of: 1) the first plurality of one or more hierarchical levels and 2) the second plurality of one or more hierarchical levels, includes at least one or more heading levels and one or more content levels.

5. The method of claim 1, wherein evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

6. The method of claim 1, wherein the procedure, of the first plurality of one or more procedures, of evaluating relevance of documents using a link structure of the crawled documents, further comprises:
   expanding the graph with a second plurality of one or more documents from the database, wherein a third plurality includes a union of the first plurality of documents and the second plurality of documents, and the third plurality of documents is smaller than the plurality of received documents.

7. The method of claim 1, wherein the procedure, of the first plurality of one or more procedures, of evaluating relevance of documents using a link structure of the crawled documents, further comprises:
   expanding the graph with a second plurality of one or more documents from the database, such that a third plurality includes a union of the first plurality of documents and the second plurality of documents, and the third plurality of documents is smaller than the plurality of received documents, the second plurality including one or more of: 1) one or more documents connected within a first specified number of links in a forward direction from one or more documents of the first plurality of documents, the forward direction being forward from the first plurality of documents, and 2) one or more documents connected within a second specified number of links in a backward direction from one or more documents of the first plurality of documents, the backward direction being backward from the first plurality of documents.

8. The method of claim 1, wherein the procedure, of the first plurality of one or more procedures, of evaluating relevance of documents using a link structure of the crawled documents, further comprises:
   expanding the graph with a second plurality of one or more documents from the database, such that a third plurality includes a union of the first plurality of documents and the second plurality of documents, and the third plurality of documents is smaller than the plurality of received documents, the second plurality including one or more of: 1) all documents connected within a first specified number of links in a forward direction from one or more documents of the first plurality of documents, the forward direction being forward from the first plurality of documents, and 2) all documents connected within a second specified number of links in a backward direction from one or more documents of the first plurality of documents, the backward direction being backward from the first plurality of documents.

9. The method of claim 1, wherein the first plurality of documents includes recently received documents of the plurality of received documents.

10. The method of claim 1, wherein the procedure, of the first plurality of one or more procedures, of evaluating relevance of documents using a link structure of the crawled documents, further comprises:
    shrinking the graph by removing one or more nodes of the graph.

11. The method of claim 1, wherein the procedure, of the first plurality of one or more procedures, of evaluating relevance of documents using a link structure of the crawled documents, further comprises:
    shrinking the graph by combing one or more sets of one or more nodes of the graph.

12. The method of claim 11, wherein the combining is based on common characteristics of the nodes or relationships between the nodes.

13. The method of claim 1, wherein the propagating weights through the graph occurs up to a limited node distance.

14. The method of claim 1, wherein weights assigned to a document include at least one of relevance of the document to the query input and importance of the document independent of the query input.

15. The method of claim 1, wherein the second plurality of procedures further includes one or more of: 1) evaluating relevance of documents using logical expressions of keywords and phrases, 2) evaluating relevance of documents using a link structure of the crawled documents, and 3) evaluating relevance based on freshness of documents.

16. A method, comprising:

performing a plurality of focused crawls, wherein each of the plurality of focused crawls comprises:

accessing a query input;

crawling a plurality of documents, the documents including links to each other, and the crawling at least partly guided by a crawl metric, the crawl metric at least partly determined by a first mechanism, the first mechanism including a first combination, the first combination including evaluating relevance of documents using a link structure of the crawled documents wherein the evaluating relevance of documents using a link structure of the crawled documents is performed repeatedly and continually, and wherein the evaluating relevance of documents using a link structure of the crawled documents includes:

accessing a first plurality of documents from a database of a plurality of received documents, the plurality of received documents including crawled documents, the first plurality of documents to be ranked, generating a graph of the first plurality of documents, assigning weights to a plurality of nodes of the graph wherein nodes of the graph represent the documents and edges represent links between the documents, finding an assignment of weights to one or more nodes of the graph, by propagating weights through the graph, the assignment of weight to a node based at least in part on calculating a weighted sum of weights propagated from neighboring nodes, and generating a ranked list of at least the first plurality of documents, the ranked list at least partly generated from the graph; and returning target documents, the target documents being relevant to the query input, the target documents found from the plurality of crawled documents, the target documents returned at least partly based on a search metric, the search metric quantifying relevance or importance of a document to the query input, the search metric at least partly determined by a second mechanism, the second mechanism including a second combination, the second combination being different from the first combination, the second combination including one or more of 1) evaluating relevance of documents using logical expressions of keywords and phrases, 2) evaluating relevance of documents using a template including a plurality of one or more template portions, at least one of the template portions including a plurality of one or more hierarchical levels, 3) evaluating relevance of documents using a link structure of the crawled documents, and 4) evaluating relevance based on freshness of documents, wherein the method is performed on at least one of 1)a first processor and 2) one or more of a first plurality of one or more processors.

17. The method of claim 16, wherein relevance includes importance.

18. The method of claim 16, wherein evaluating relevance of documents includes evaluating relevance of at least a first document and a second document, the second document referring to the first document.

19. The method of claim 16, wherein evaluating relevance includes evaluating relevance of at least a first document and one or more of a first plurality of one or more referring documents and a second plurality of one or more referring documents, each of the first plurality of one or more referring documents referring to the first document directly, and each of the second plurality of referring documents referring to the first document indirectly through one or more documents.

* * * * *